United States Patent

Miyazawa

[11] Patent Number: 5,576,605
[45] Date of Patent: Nov. 19, 1996

[54] MICRO ROBOT AND HOLDING CASE THEREFOR

[75] Inventor: Osamu Miyazawa, Nagano-ken, Japan

[73] Assignee: Seiko Epson Corporation, Tokyo, Japan

[21] Appl. No.: 256,605

[22] PCT Filed: Nov. 12, 1993

[86] PCT No.: PCT/JP93/01654

§ 371 Date: Jul. 14, 1994

§ 102(e) Date: Jul. 14, 1994

[87] PCT Pub. No.: WO94/12918

PCT Pub. Date: Jun. 9, 1994

[30] Foreign Application Priority Data

Nov. 20, 1992 [JP] Japan .................................. 4-312063
Dec. 9, 1992 [JP] Japan .................................. 4-329385

[51] Int. Cl.⁶ ........................................................ B25J 5/00
[52] U.S. Cl. ........................ 318/568.12; 318/568.16; 318/577; 364/424.02
[58] Field of Search ................ 364/424.05, 424.04, 364/424.02; 318/587, 568.12, 560, 563, 565, 568.16, 577

[56] References Cited

U.S. PATENT DOCUMENTS

| | | | |
|---|---|---|---|
| 4,119,900 | 10/1978 | Kremnitz | 318/587 |
| 4,905,151 | 2/1990 | Weiman et al. | 364/424.02 |
| 5,304,809 | 4/1994 | Sasaki et al. | 318/568.12 |

FOREIGN PATENT DOCUMENTS

| | | |
|---|---|---|
| 151996 | 5/1982 | European Pat. Off. . |
| 63-7706 | 1/1988 | Japan . |
| 2-44255 | 3/1990 | Japan . |
| 2-134593 | 5/1990 | Japan . |
| 3-70015 | 3/1991 | Japan . |
| 3-68276 | 3/1991 | Japan . |

Primary Examiner—John W. Cabeca
Attorney, Agent, or Firm—Ladas & Parry

[57] ABSTRACT

A micro robot which is less than about one cubic centimeter in size and adapted for wireless control and which includes at least two photo sensors (12,14) having detection areas partly overlapping each other, at least a pair of drive units (28, 30) adapted to be driven independently of each other and having driving points apart in a direction perpendicular to a direction for travel, a controller (58) including a CPU and responsive to outputs of the photo sensors to control the drive units, a power supply unit (16) including a rechargeable battery and a voltage regulator circuit (56) for regulating and outputting the battery voltage for supplying a power supply voltage to the photo sensors, the drive units and the controller, and a reset circuit (40) responsive to the reception for a command in a non-contact manner from the outside to send a reset signal to the controller and a holding case for the micro robot which permits charging of the micro robot during its accommodation.

15 Claims, 28 Drawing Sheets

MICRO ROBOT AND HOLDING CASE THEREFOR

The present invention relates to a robot having a size of about one cubic centimeter and adapted for wireless control, and a holding case for accommodating the robot which is capable of charging, etc., during the period of accommodation.

In the past, the wireless control of a robot has been effected by a control which is called as a radio control and a control system utilizing radio waves has been used. Also, the directional control has been effected by superposing control signals on the radio waves to steer the robot. On the other hand, it has been the practice to use a directional antenna or to concurrently utilize visual sensors or the like to direct the robot in the desired direction in a self-control manner. The running part includes wheels to reduce the running resistance. Also, its charging terminals are composed of rigid contacts which are formed in the recess of a frame member.

However, since the previously mentioned robot control system utilizes the radio waves, each of the transmitting side and the receiving side requires many electric elements and a mechanism for steering purposes is required thereby making the system unsuited for miniaturing purposes. Also, in order to realize for example a system which causes the robot to autonomously move in a direction in which the radio waves are transmitted, the previously mentioned antenna or sensors must be additionally provided and in this respect the system is not suited for the purposes of miniaturization. Moreover, where the parts other than the driving parts are supported by the wheels, it is impossible to go over the large irregularities if the wheels are small, whereas the miniaturization is difficult if the wheels are large. The reduction of the charging terminals in size is impossible from the standpoint of the handling and this becomes an obstacle for the miniaturization.

In view of these circumstances, the present inventor has developed a micro robot movable by sensing light and has filed an international application as PCT/JP92/01415. This micro robot is as small as about one cubic centimeter in size and very high in sophistication and it is found that not only its handling requires circumspection but also there are rooms for improvement with respect to the operationaltry and moving performance of the micro robot.

Then, it is the usual practice so that generally a plastic container or the like is used for the packaging of a small and precision article and the article proper, its various components (where the components permit to be individually disassembled), its accessories, etc., are snugly accommodated. In other words, only the holding pockets for the components, accessories, etc., are suitably arranged.

The micro robot developed by the inventor is of a charging type and additionally it requires remote control devices for robot operating purposes. In addition, in view of the nature of the micro robot, it is necessary that its holding case is small and compact and moreover its removal, handling, etc., are easy. Also, to simply accommodate the required articles for the micro robot is rather inconvenient and troublesome from the operation standpoint of the robot.

The present invention has been made in view of these circumstances and it is an object of the present invention to provide a micro robot which is improved in operationality and moving performance, small in size and adapted for wireless control.

It is another object of the present invention to provide a compact holding case of about pocketable size which has not only the function of accommodating such articles as mentioned previously but also various functions to permit for example the charging during the period of accommodation in view of the previously mentioned special characteristics of the micro robot.

In accordance with one aspect of the present invention, a micro robot includes at least two sensors whose detection areas partly overlap each other, at least one pair of drive units adapted to be driven independently of each other and having driving points which are apart from each other in a direction perpendicular to the direction of travel, a controller including a CPU and responsive to the outputs of the sensors to control the drive units, a power supply unit including a rechargeable battery to supply a supply voltage to the drive units and the controller, and a reset circuit for sending a reset signal to the controller in response to the receipt of a command applied in a non-contact manner from the outside. By so constructing, the miniaturization is made possible. Particularly, by partially overlapping the detection areas of the two sensors, it is possible to provide a function of autonomously moving toward a goal by means of simple circuitry. Also, since the drive units are controlled independently of each other, it is possible to control complicated operations by means of a simple mechanism. Further, since a reset signal can be supplied externally in a non-contact manner, its operation is simplified.

In accordance with another aspect of the present invention, a micro robot includes at least two sensors whose detection areas overlap partly each other, at least one pair of drive units adapted to be driven independently of each other and having driving points which are apart from each other in a direction perpendicular to the direction of travel, a controller including a CPU and responsive to the outputs of the sensors to control the drive units, a power supply unit including a rechargeable battery and a voltage regulator circuit for regulating and outputting the voltage of the battery and adapted to supply the supply voltage to the sensors, the drive units and controller, and a starting control circuit whereby during the starting period the output voltage of the battery and a reset signal are supplied to the controller and then after the lapse of a given time the output voltage of the voltage regulator circuit is supplied in place of the output voltage of the battery to the controller and the reset signal is released. Since it is so designed that during the starting period the high output voltage of the battery and a reset signal are supplied to the controller and then after the lapse of a given time the output voltage of the voltage regulator circuit is supplied in place of the output voltage of the battery to the controller and the reset signal is released, the stable operation is ensured.

In accordance with another aspect of the present invention, the micro robot includes an obstruction sensor made of a slender rod-shaped member so that its one end serves as a fulcrum and the other end is turned on the former thereby detecting an obstruction in accordance with the operating condition of the sensor. When the obstruction sensor detects an obstacle, the controller drives at least one of the pair of drive units in the reverse direction for a given time and the micro robot is automatically moved away from the obstacle. By then bringing back into its steady-state operation, the micro robot can be automatically moved in a direction away from the obstruction.

In accordance with another aspect of the present invention, the micro robot includes a buzzer which is controlled by the controller and the buzzer can be controlled to transmit information to the outside.

In accordance with another aspect of the present invention, the micro robot includes a pair of light-emitting diodes connected inverse parallel and controlled by the controller. By suitably controlling the light emission of the pair of light-emitting diodes, it is possible to transmit information to the outside.

In accordance with another aspect of the present invention, the micro robot is designed so that each of the sensors is contained, along with one of the light-emitting diodes, in one package and arranged at the position of the eye in the micro robot. As a result, the sensing and the light emission can be effected alternately at the positions of the eyes and the sensors are allowed to function as eyes.

In accordance with another aspect of the present invention, the micro robot includes a pair of wheels each composed of an outer ring and zigzag-shaped forked members for supporting the outer ring thereby producing a metal wheel which is not permanently deformed but elastically deformed even if a strong force is applied to it.

Next, a micro robot holding case according to the present invention includes a micro robot holding cavity, a battery box for receiving a battery which charges the power supply of the micro robot, a base plate forming a charging circuit connected to the battery box, including energy supply means for the micro robot and attached to the case proper, and a cavity for receiving an operating instrument of the micro robot.

Here, the energy supply means includes means for mechanically connecting the terminals of the robot and electrode provided on the base plate as well as non-contact energy supply means employing an energization coil, photovolatic cell or the like.

This holding case is designed so that when the micro robot is accommodated in the robot holding cavity, it is connected to the internal battery power source of the robot through the energy supply means of the base plate and therefore the robot can be charged during its accommodation period. Since the robot is extremely small in size and made in a sophisticated manner, this arrangement is intended to reduce the chance of battery exchange, to reduce the causes of troubles and to make it easy to use.

In accordance with another aspect, a holding case is so designed that as regards the layout of the respective articles and components, at least any of the following arranging relations with respect to the case proper is met. In other words, it is required to use such arranging relation that the robot holding cavity is arranged on the right side, the battery box on the left side, the base plate below the robot holding cavity or the robot operating instrument on the front side. Also, it is possible to arrange the electrodes parallel to each other on the base plate to provide at least two robot holding cavities thereby arranging the robots parallel between the electrodes. Where a feeler and a tail are used as the connecting terminals of the robot, a capsule having magnets attached thereto is additionally placed on the robot so as to bring the respective lead terminals into close contact with the electrodes. The lead terminals are held by the attractive force of the magnets and attrached to the electrodes. It is to be noted that the capsule may be constructed so as to be mechanically removably engaged with the robot holding cavity.

By so arranging the robot holding cavity on the right side, the battery box on the left side, the base plate below the robot holding cavity and the robot operating instrument on the front side in the case proper, the holding case can be made as small as about a pocketable size and convenient for carrying with one.

Since the robot and the various articles required for its operation are rationally arranged and accommodated, their removable and handling are easy. Also, by placing the capsule on the robot in its accommodated condition and fastening the capsule to the electrodes on the base plate by the magnets and the mechanical engaging means, it is possible to cause the lead terminals of the robot to be held against the electrodes and to make the connection of the robot and the electrodes easy. Thus, by simply placing the capsule on the robot in its accommodated condition, the connection to the charging circuit can be easily provided. The accommodated condition of the robot can also be stabilized by the capsule.

In accordance with another aspect of the present invention, the holding case has various functions other than the previously mentioned robot charging function, etc. For instance, an operational or moving command can be applied to the robot by command means. Such information as the contents of its program, the internal power supply voltage, etc., can also be represented in association with the command means. For this purpose, the case proper may be constructed to include signal transmission means to effect the transmission and reception of signals between it and the controller which is incorporated in the robot and governs the operation of the robot and an operation circuit for performing at least commanding operations on the robot controller. The operation circuit includes a reset circuit for resetting the charging circuit and the robot controller and the reset circuit is incorporated in the robot. In addition, the charging ciricuit includes a battery checking switch and a reset switch operatively associated with the former switch to short-circuit the power supply circuit of the robot. By virtue of this reset circut, the resetting is effected at the same time that the charging of the robot is started and the robot controller is prevented from running away. Also, when the robot is in accommodation, the program contents of the robot, the power supply voltage, etc., can be checked.

Figure 1:
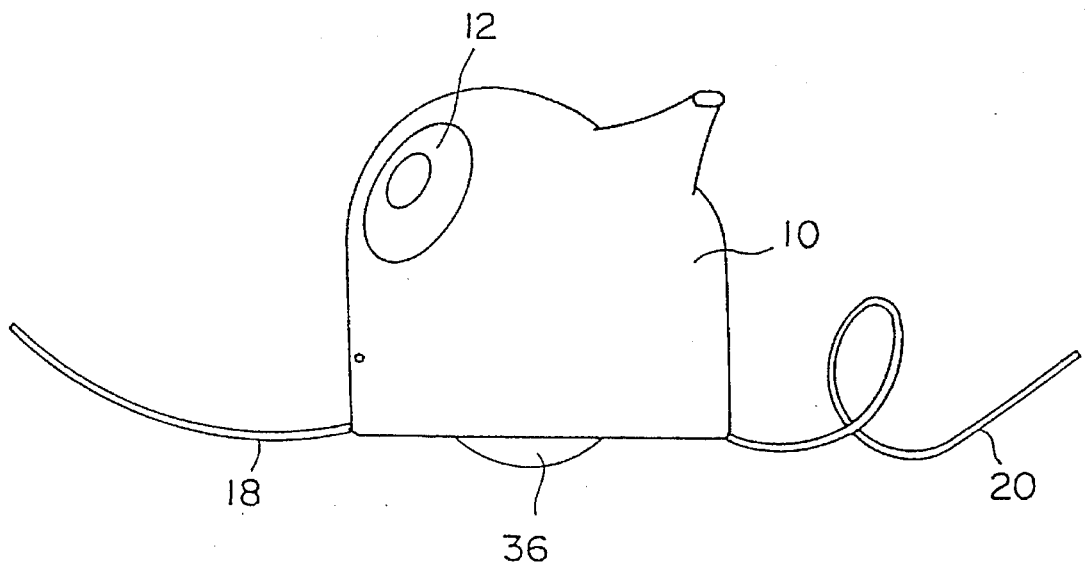
FIG. 1 is a side view of a micro robot according to an embodiment of the present invention.
Figure 2:
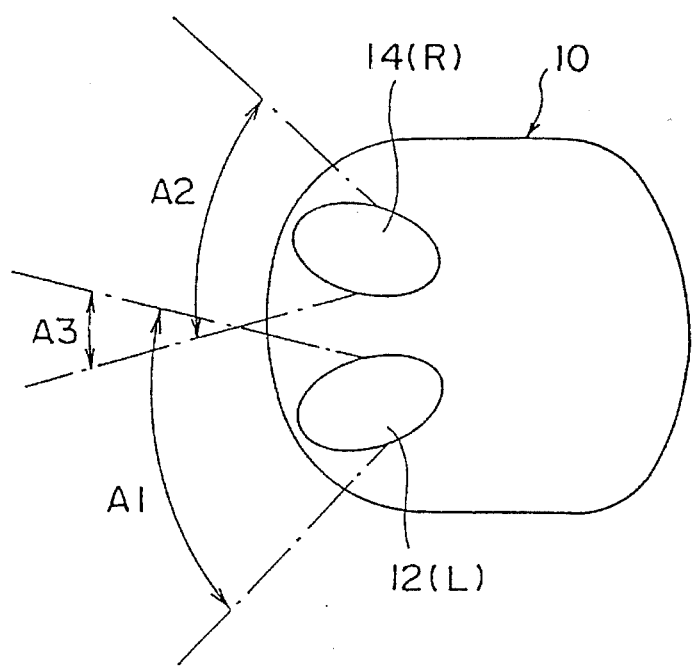
FIG. 2 is a to view of FIG. 1.

FIG. 1 is a side view of a micro robot according to an embodiment of the present invention, and FIG. 2 is a top view of FIG. 1. A robot proper 10 has a size of about one cubic centimeter and its front portion is provided with a pair of sensors 12 and 14 as shown in the Figure. While light sensors composed for example of photodiodes or pho- totransistors, ultrasonic sensors of the type employing a piezoelectric element to convert a sound wave to a voltage, etc., may be used for these sensors 12 and 14, it is assumed that photo transistors are used in this embodiment. Then, the sensor 12 has a visual field A1 as a detection area and also the sensor 14 has a visual field A2 as a detection area whereby the visual fields A1 and A2 partly overlap at the central portion thereof and the sensors 12 and 14 involve a partly overlapped visual field A3. Thus, if the light from a light source is present at the front or the visual field A3, the light is detected by both of the sensors 12 and 14. It is to be noted that the sensor 12 is referred to as an L-sensor in the flow charts of the drawings which will be described later since it is arranged on the left side in the robot proper 10 and also the sensor 14 is referred to as an R-sensor since it is arranged on the right side in the robot proper 10.

Figure 3:
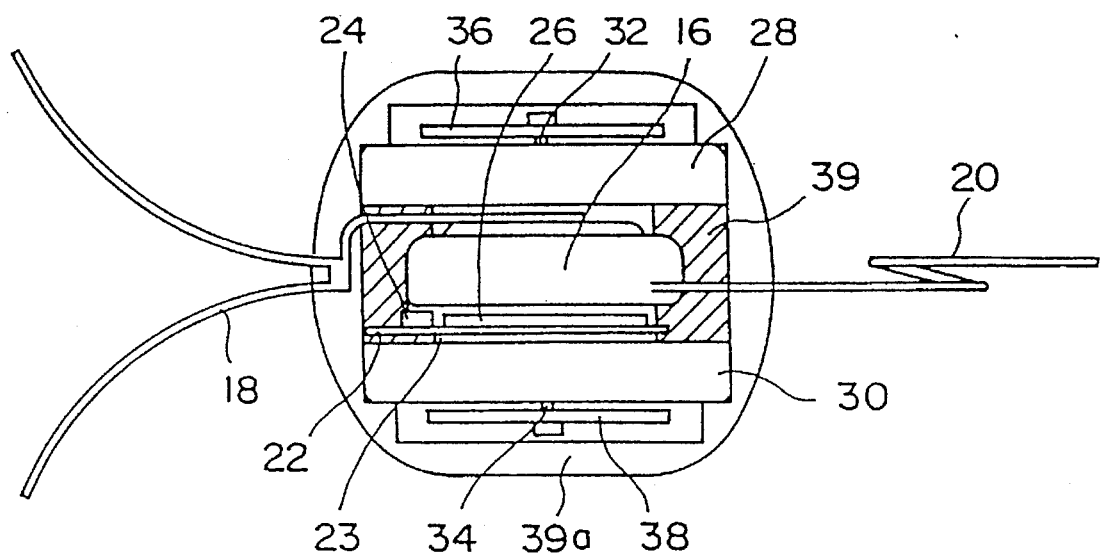
FIG. 3 is a bottom view of FIG. 1.

FIG. 3 is a bottom view of FIG. 1. A power supply unit 16 is arranged in the central portion, is composed for example of an electric double-layer capacitor, nickel-cadmium battery or the like and is constructed so as to be chargeable through a feeler 18 and a tail 20 which are respectively provided for charging and balancing purposes. A circuit section 22 is disposed adjacent to the power supply unit 16. The circuit section 22 includes a CPU-IC 24, a pull-down chip resistor 26, etc., which are mounted on a circuit board 23 and its details will be described later. Each of drive units 28 and 30 incorporates a stepping motor and a reduction gear and these units are controlled by the circuit section 22 whereby wheels 36 and 38 respectively fitted on output shafts 32 and 34 are driven into rotation by the stepping motors and the reduction gears. Rubber is attached to the outer periphery of each of the wheels 36 and 38. It is to be noted that the shape of the wheels 36 and 38 is not limited to the circular shape and it may take the form of any other shape such as a triangular shape, square shape or the like depending on the application.

Spacers 39 support the power supply unit 16, the circuit section 22 and the drive units 28 and 30 on a frame member 39a. The power supply unit 16 and the circuit section 22 are arranged in a superposing relation between the pair of drive units 28 and 30. As a result, the power supply unit 16 and the circuit section 22 can occupy a wide area in proportion to the total volume. As a result, in the power supply unit 16 the internal resistance of the capacitor or the secondary cell can be reduced to permit the generation of a large current with improved efficiency and also the circuit section 22 is advantageous in the mounting of large IC chips having complicated functions. In addition, the drive units 28 and 30 are arranged in positions which are apart from each other thereby preventing the occurrence of magnetic interference, etc.

Figure 4:
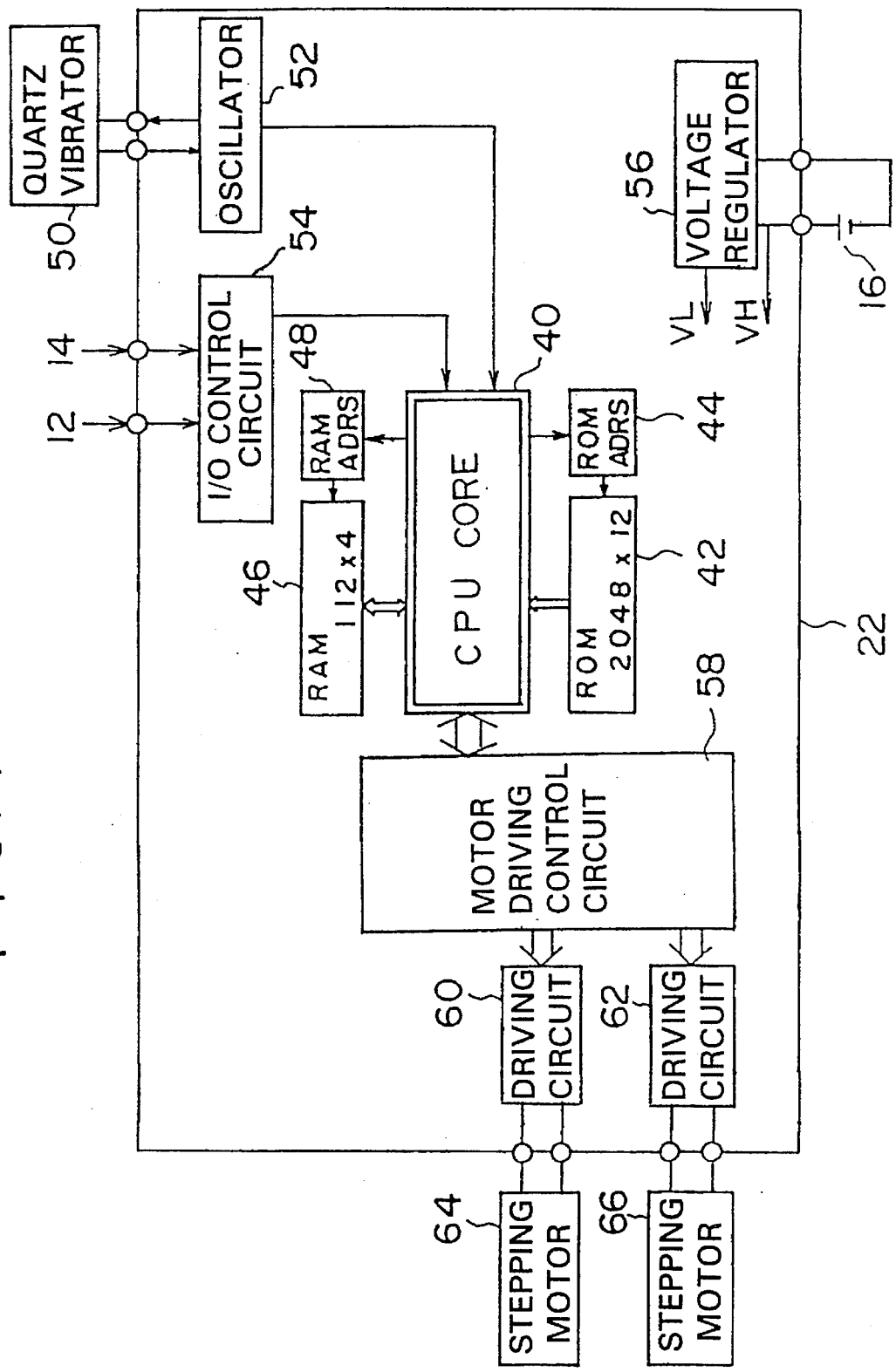
FIG. 4 is a block diagram showing the details of the circuit section of FIG. 1.

FIG. 4 is a block diagram showing the details of the CPU-IC 24. Connected to a CPU core 40, including an ALU, various registers, etc. are an ROM 42 storing programs an address decoder 44 for the ROM 42, an RAM 46 storing various data and an address decoder 48 for the RAM 46. A quartz vibrator 50 is connected to an oscillator 52 whose oscillation signals are supplied as clock signals to the CPU core 40. The outputs of the sensors 12 and 14 are applied to an I/O control circuit 54 and these signals are outputted to the CPU core 40. A voltage regulator 56 regulates and stabilizes the voltage of the power supply unit 16 at a low voltage which is in turn supplied to the circuit section 22. A motor driving control circuit 58 effects the transmission and reception of control signals between it and the CPU core 40 to control stepping motors 64 and 66 through motor driving circuits 60 and 62, respectively. The supply voltage for these circuits, etc., is supplied from the power supply unit 16.

It is to be noted that the stepping motor 64 is referred to as an R-motor in the flow charts in the drawings which will be described later since it is incorporated in the drive unit 30 and arranged on the right side in the robot proper 10, and also the stepping motor 66 is similarly referred to as an L-motor since it is incorporated in the drive unit 28 and arranged on the left side in the robot proper 10.

Figure 5:
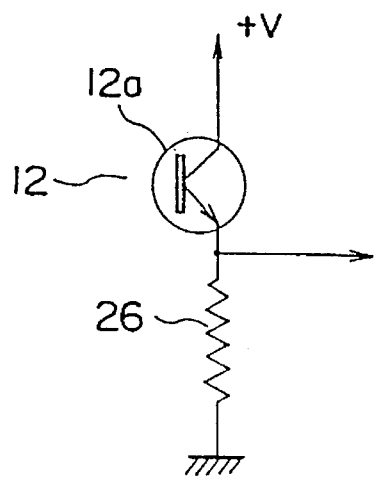
FIG. 5 is a circuit diagram of the sensor.

FIG. 5 is a circuit diagram of the sensor 12. The sensor 12 is composed of a phototransistor 12a, and a pull-down resistor 26 is connected in series with the emitter of the phototransistor 12a. A photosensing output is taken from the emitter of the phototransistor 12a so that the photosensing output is reshaped by the I/O control circut 54 and outputted to the CPU core 40. This circuit diagram is for the case of the sensor 12 and the circuit construction is all the same for the sensor 14.

Figure 6:
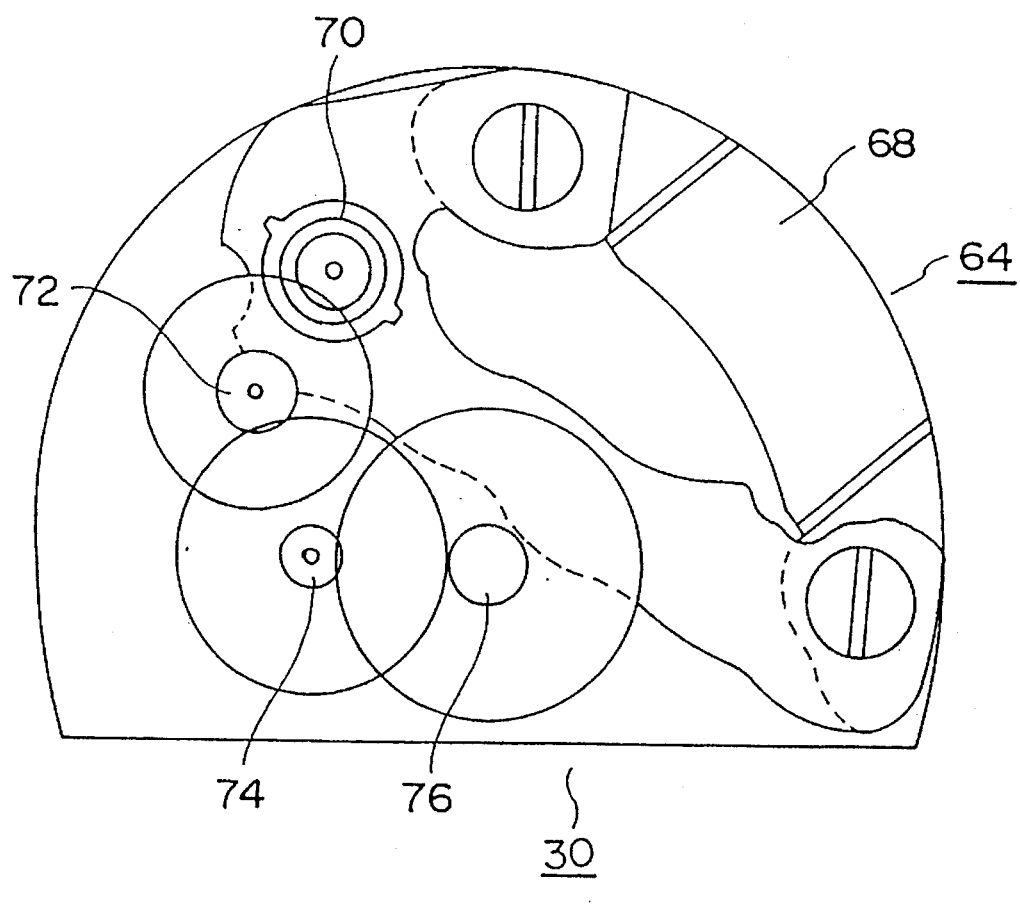
FIG. 6 is a plan view of the drive unit in FIG. 1.
Figure 7:
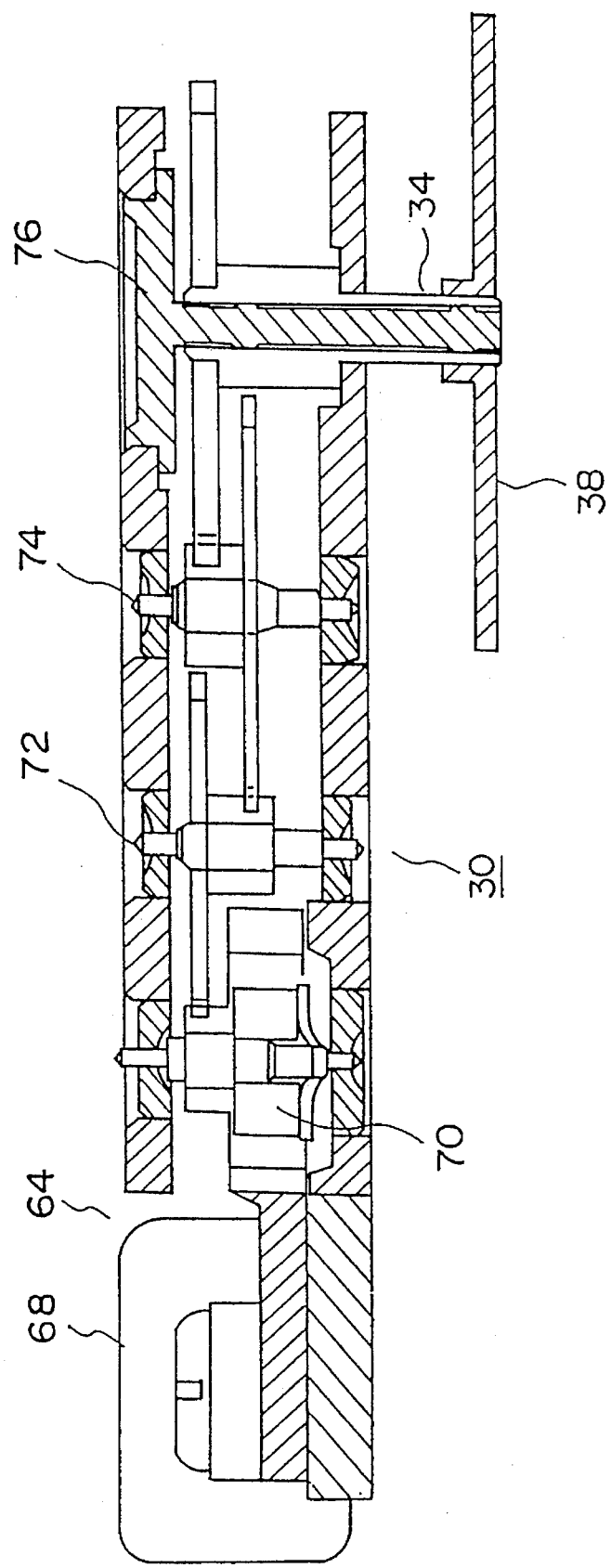
FIG. 7 is an expansion view of FIG. 6.

FIG. 6 is a plan view of the drive unit 30 and FIG. 7 is an expansion view of FIG. 6. The stepping motor 64 includes an energization coil 68 and a rotor 70 composed of a magnet and thus an electromagnetic-type two pole stepping motor used in electronic watches employed in this embodiment. Therotor 70 drives a pinion 72 which in turn drives a pinion 74 through a gear, and the pinion 74 drives a pinion 76 through a gear thereby causing the pinion 76 reduced in speed to drive the wheel 38 into rotation. The mechanism of the electronic watch is applied to the mechanism of FIGS. 6 and 7. The mechanism of the drive unit 28 is the same with the mechanism of FIGS. 6 and 7. As shown in FIGS. 6 and 7, the stepping motors 64 and 66 are decelerated from their high speed rotations to drive the wheels into rotation and in this way the miniaturization of the drive units 30 and 28 is attained. In addition, the energization coil 68 is disposed at a position apart from the rotor 70 and in this respect the drive units 30 and 28 are further reduced in thickness and size.

Figure 8:
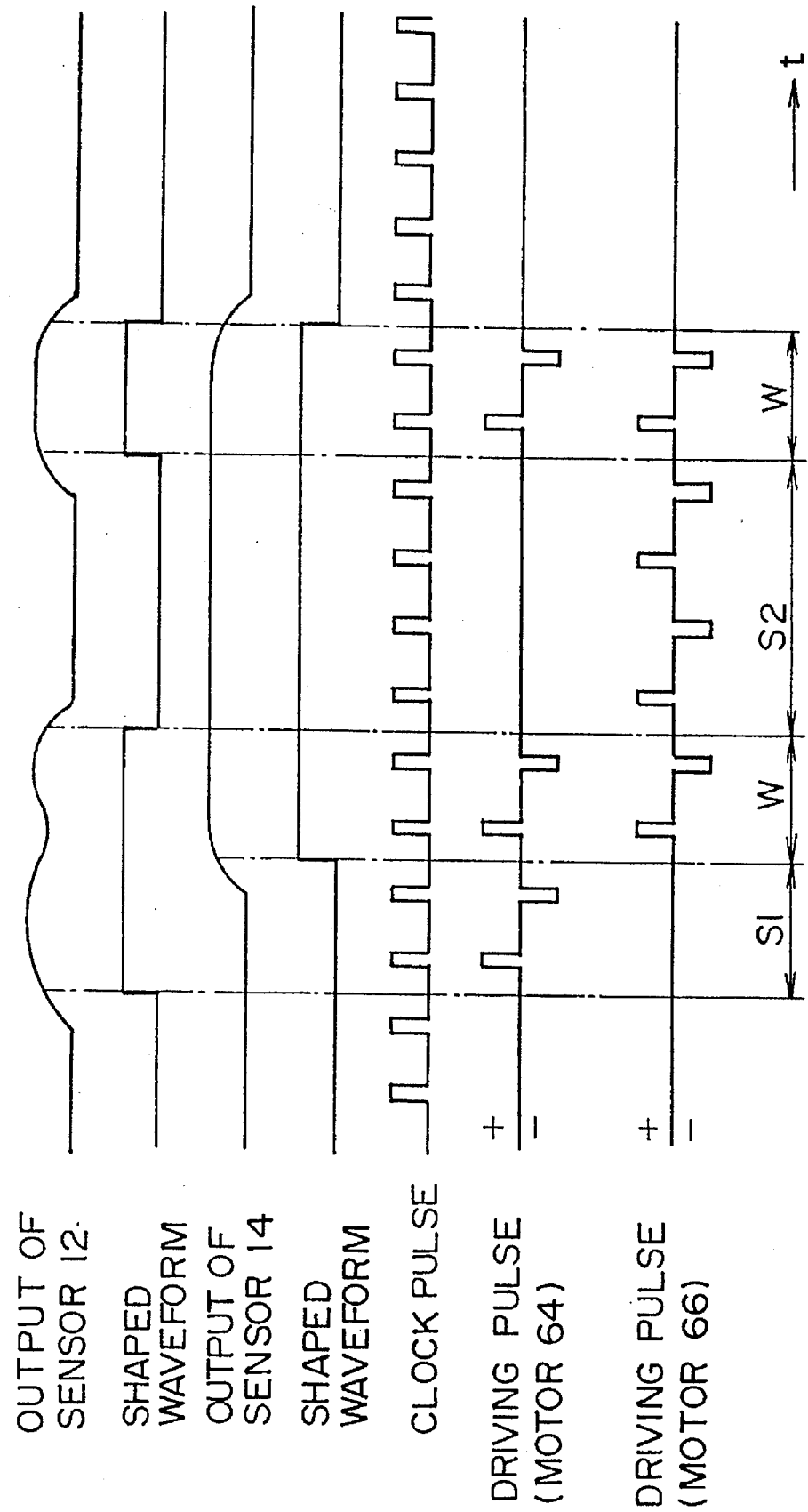
FIG. 8 is a timing chart showing an example of the basic operation of the robot according to the embodiment of FIG. 1.

FIG. 8 is a timing chart showing a example of the basic operation of the robot according to the above-mentioned embodiment. While the outputs of the sensors 12 and 14 are OV in the absence of any incident light, the incidence of light causes each of the sensors 12 and 14 to generate a voltage corresponding to the incident light quantity. These voltages are shaped according to the desired threshold voltage in the I/O control circuit 54 and then applied to the CPU core 40 whereby the motor driving control circuit 58 supplies alternate positive and negative driving pulses to the stepping motors 64 and 66 through the driving circuits 60 and 62. Thus, in an interval S1 where the sensor 12 is receiving the light, the stepping motor 64 is driven and the wheel 38 is driven into rotation. In an interval S2 where the sensor 14 is receiving the light, the stepping motor 66 is driven and the wheel 36 is driven into rotation. In an interval W where both of the sensors 12 and 14 are receiving the light, the stepping motors 64 and 66 are driven and the wheels 38 and 36 driven into rotation. Thus, as the most simple example of the driving, when the light from the light source is present in the visual field A1 (excluding the visual field A3), the photo sensor 12 receives the light so that in response to its photosensing output the stepping rotor 64 rotates the wheel 38. At this time, the wheel 36 is at rest and therefore the robot proper 10 as a whole is caused to make a turning movement toward the left direction. Also, when the light from the light source is present in the visual field A2 (excluding the visual field A3), the photo sensor 14 receives the light so that in response to its photosensing output the stepping motor 66 rotates the wheel 36. At this time, the wheel 38 is at rest an therefore the robot proper 10 as a whole is caused to make a turning movement toward the right direction. On the other hand, if the light from the light source is present in the visual field A3, the photo sensors 12 and 14 receive the light so that in response to their photosensing outputs the stepping motors 64 and 66 drive the wheels 38 and 36 into rotation and the robot proper 10 makes a straight line movement. The robot proper 10 is controlled in this way to move toward the light source.

Figure 9:
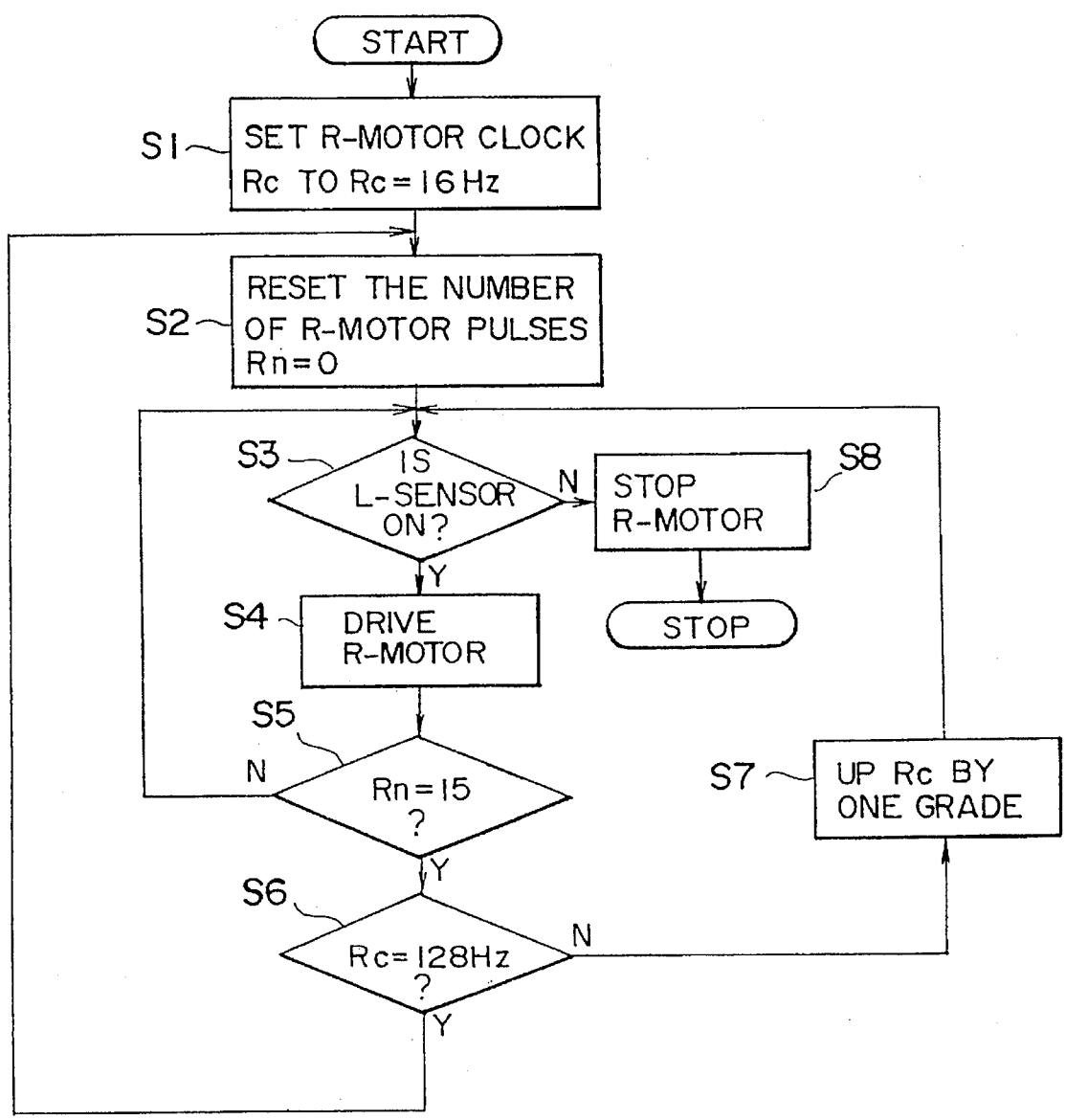
FIG. 9 is a timing chart showing the basic operation during the driving starting period of the robot according to the embodiment of FIG. 1.

While the foregoing description of the operation has explained the cases where the robot is driven at a constant speed is response to the reception of light by the sensors 12 and 14, the driving force will be increased if the driving is accelerated during the initial period of the driving. FIG. 9 is a flow chart showing the basic operation for the case where an acceleration control is performed during the initial period of the driving.

Initially, the CPU core 40 sets the clock frequency Rc of the driving pulses for the stepping motor 64 to 16 Hz(S1) and then resets the value Rn of a counter for counting the driving pulses (S2). Then, it is determined whether there is a photosensing output from the sensor 12 (S3) so that if there is a photosensing output, one pulse of the driving pulses of the clock frequency RC is supplied to drive the stepping motor 64 and the pulse is counted (S4). It is determined whether the resulting count value Rn has attained a given value, e.g., "15" (S5) so that if it has not attained "15", the previously mentioned processing steps (S3) and (S4) are repeated.

When the driving has been effected for 15 pulses of the driving pulses of the clock frequency Rc(=16 Hz), it is then determined whether the clock frequency Rc of the driving pulses has attained 128 Hz (the maximum value) so that if the value has not been attained, the clock frequency Rc of the driving pulses is set for example to 32 Hz(ST), and the above-mentioned processing steps are similarly repeated. Then, when the clock frequency Rc of the driving pulses has attained 128 Hz (the maximum value) (S6), the driving is thereafter effected by the driving pulses of this frequency. When the sensor 12 no longer generates any photosensing output (S3), the stepping motor 64 is stopped (S8). This flow chart shows the relation between the sensor 12 (L-sensor) and the stopping motor (R-motor) and the relation between the sensor 14 (R-sensor) and the stepping motor 66 (L-motor) is all the same.

In this connection, while, for the ease of explanation, the flow chart of FIG. 9 does not describe the relation between the sensors 12 and 14, if, for example, the sensor 14 is in the light receiving condition so that the stepping motor 66 is driven and the robot proper 10 turns in the direction of the light source, the sensor 12 is also brought into its light receiving condition. In such a case, it is necessary that the driving condition of the stepping motor 64 driven by the sensor 12 coincides with the driving condition of the stepping motor 66. If the driving conditions are not brought into coincidence in such a manner, when the robot proper 10 is directed toward the light source, the straight line travel is no longer possible. In other words, the transition from the turning movement to the straight line movement cannot be effected smoothly.

Figure 10:
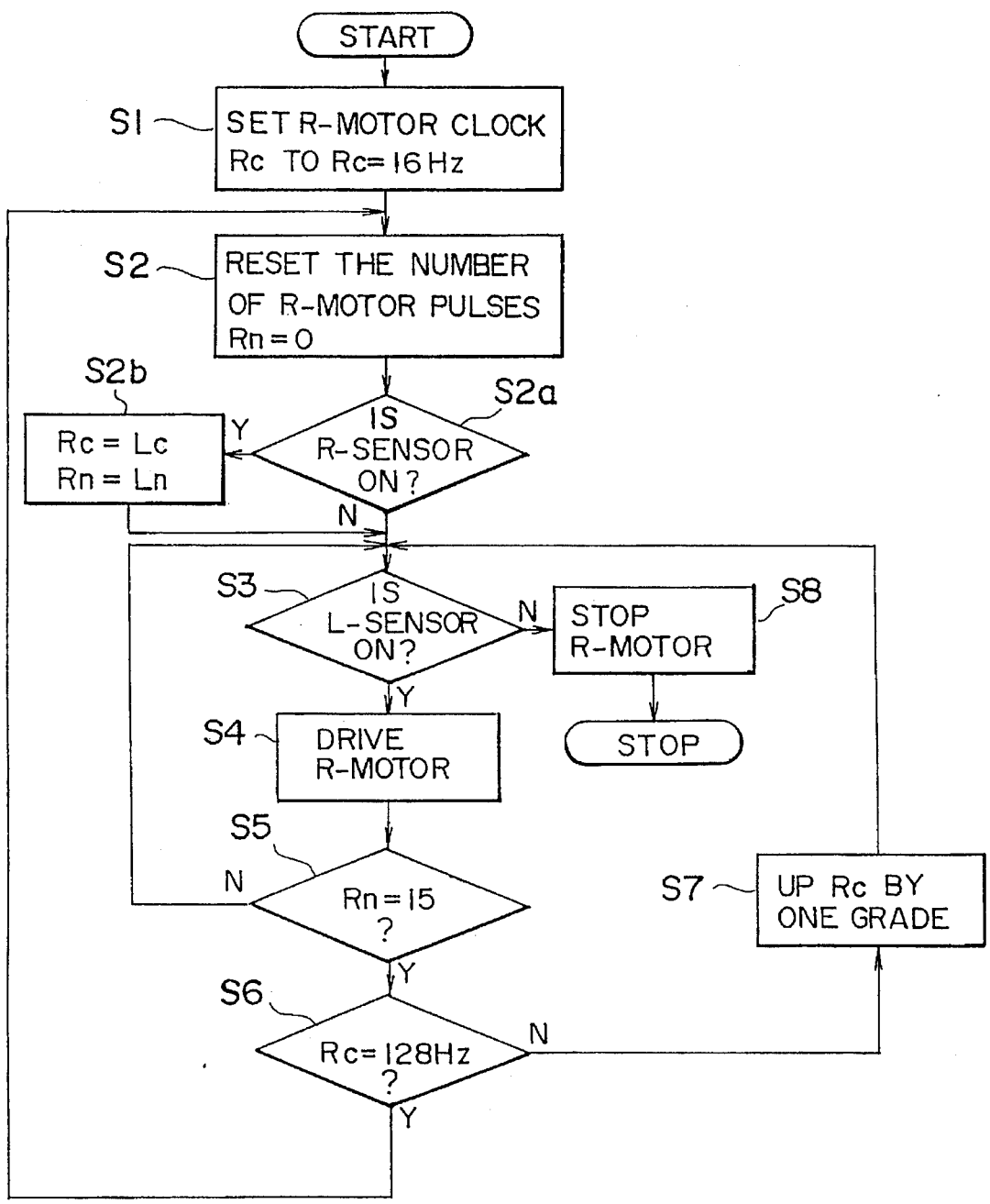
FIG. 10 is a timing chart showing the operation during the driving starting period of the robot according to the embodiment of FIG. 1.

FIG. 10 is a flow chart of a control which takes above-mentioned point into consideration. As in the previously mentioned case, the CPU core 40 sets the clock frequency RC of the driving pulses for the stepping motor 64 to 16 Hz (S1) and resets the value Rn of the counter for counting the number of the driving pulses (S2). Then, it is determined whether there is a photosensing output of the other sensor 14 (S2a). If there is a photosensing output of the sensor 14, the driving pulse clock frequency Lc and the counter value Ln of the control system of the sensor 14 are initialized as the driving pulse clock frequency Rc and the counter value Rn for the sensor 12 (S2b). After the setting has been effected in this way, the processing proceeds in the same manner as the flow chart of FIG. 9. It is to be noted that while this flow chart shows the operation of the control system for the sensor 12, the same applies to the control system for the sensor 14.

In other words, since it is designed so that when the control system of the other sensor is in the driving state during the initial period of the driving, its conditions are inputted as the initial values to effect the starting, where the light is received by only one of the sensors, the direction is changed while providing acceleration and at the instant that both of the sensors receive the light the two control systems are brought into the same driving condition to effect the straight line travel. Therefore, the transition from the turning movement to the straight line movement is effected smoothly and the response to the light is improved.

Figure 11:
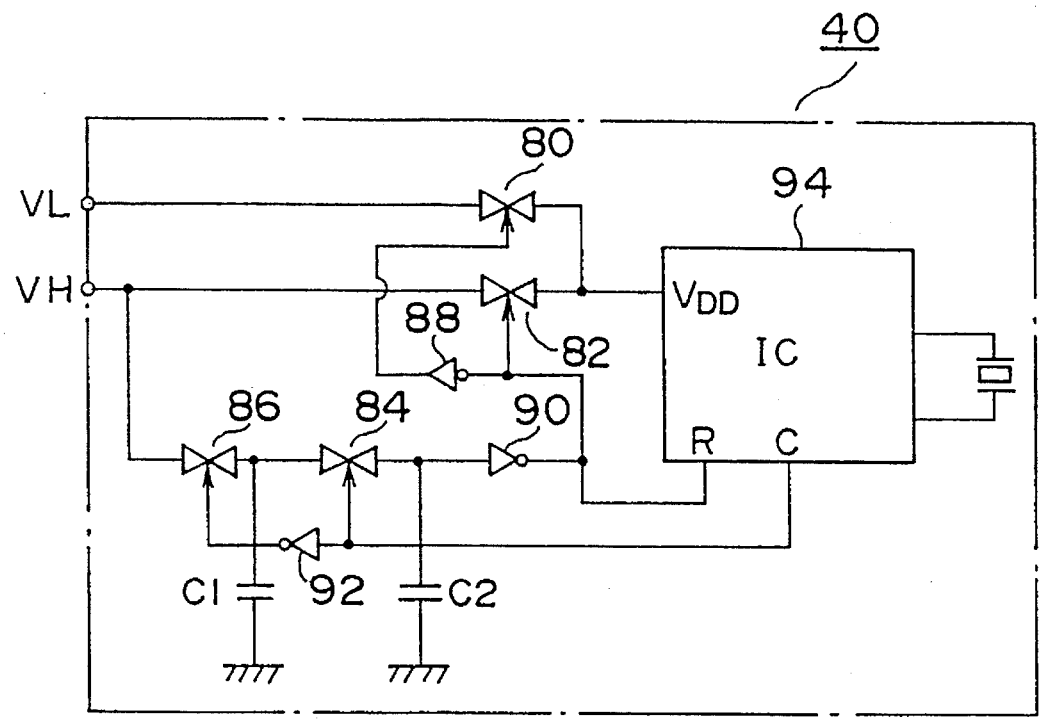
FIG. 11 is a circuit diagram extracting the reset circuit incorporated in the CPU core according to the present invention.

In this connection, this micro robot incorporates the CPU core 40 as mentioned previously and a suitable reset circuit is necessary. FIG. 11 is a circuit diagram extracting the reset circuit incorporated in the CPU core 40. In the Figure, numerals 80, 82, 84 and 86 designate analog transmission gates (hereinafter referred to as gates), 88, 90 and 92 invertors, and 4 an IC incorporating operational units such as a CPU, and C1 and C2 low-capacity capacitors. At the starting of the circuit, the IC 94 is in a state so that the oscillator incorporated therein is not oscillating as yet and no clock signal is generated. Thus, the potentials of the capacitors C1 and C2 are at the ground potential. When the voltage VH from the power supply unit 16 and the voltage VL(VH>VL) from the voltage regulator circuit 56 are supplied in such a condition, due to the fact that the potential of the capacitor C2 is at the ground potential and the input to the invertor 90 is at L, the output of the invertor 90 goes to H and it is supplied to the gate 82 which in turn is opened to supply the voltage VH to the IC 94. On the other hand, the output of the invertor 90 is also supplied to the reset terminal of the IC 94 and the IC 94 is reset. There, is no clock signal applied to the invertor 92 so that its input goes to L and thus its output goes to H, thereby opening the gate 86. When the gate 86 is opened, the voltage VH is applied to the capacitor C1 through the gate 86 and the capacitor C1 is charged.

Then, as the voltage VH is supplied to the IC 94 so that the incorporated oscillator circuit starts oscillating, a clock signal is generated and the gate 84 is opened by this clock signal. Also, the gate 86 is closed by the invertor 92. As a result, the charge on the capacitor C1 is supplied to the capacitor C2 through the gate 84 thus increasing the potential of the capacitor C2, so that the output of the invertor 90 goes to L and the resulting of the IC 94 is released thus closing the gate 82 and thereby stopping the supply of the voltage VH. At this time, the output of the invertor 90 is supplied to the gate 80 through the invertor 88 and the gate 80 is opened. As the result of the opening of the gate 80, the voltage VL is supplied to the IC 94. Thus, by virtue of the fact that during the starting period of the device a high voltage is supplied and also a reset signal is supplied and that a low voltage is Supplied and also the reset signal is released when the point is reached thus generating a clock signal, the stable operation is ensured.

Figure 12:
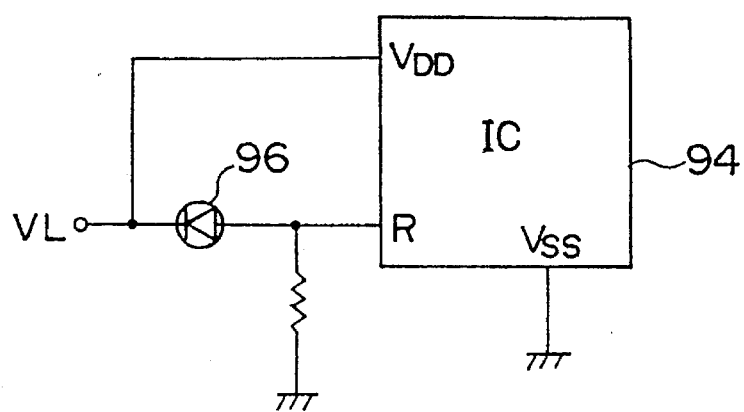
FIG. 12 is a circuit diagram showing another exemplary construction of the reset circuit according to the present invention.
Figure 13:
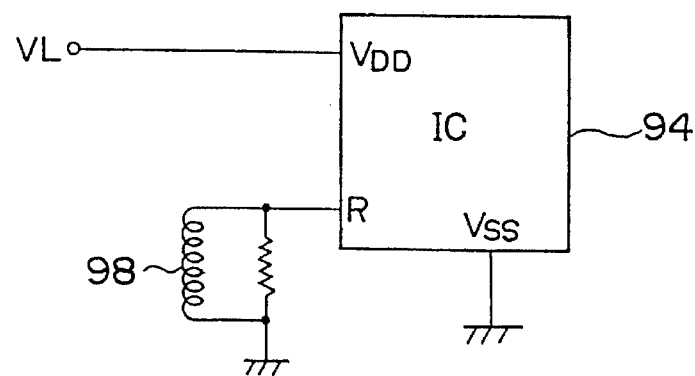
FIG. 13 is a circuit diagram showing another exemplary construction of the reset circuit according to the present invention.
Figure 14:
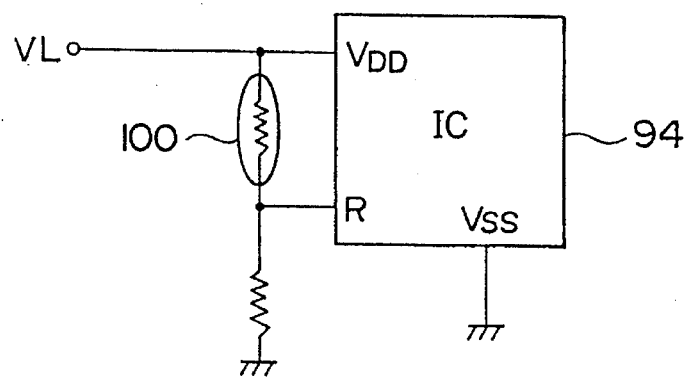
FIG. 14 is a circuit diagram showing another exemplary construction of the reset circuit according to the present invention.
Figure 15:
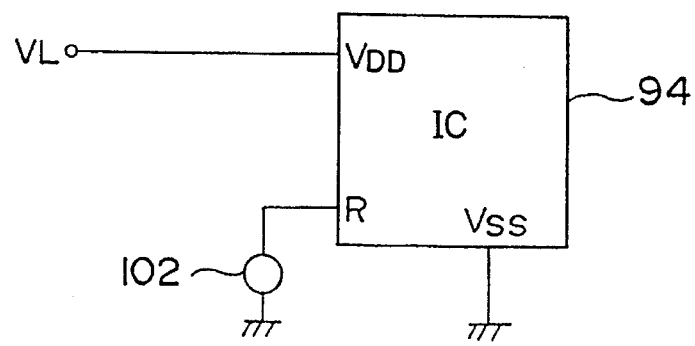
FIG. 15 is a circuit diagram showing another exemplary construction of the reset circuit according to the present invention.
Figure 16:
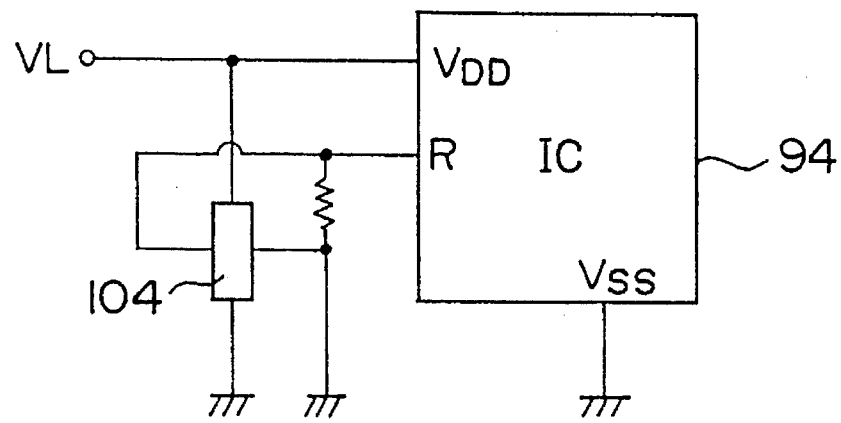
FIG. 16 is a circuit diagram showing another exemplary construction of the reset circuit according to the present invention.

FIGS. 12 to 16 are circuit diagrams show in another examples of the construction of the reset circuit. The reset circuit of FIG. 12 shows the case in which a photo sensor 96 is connected. When the photo sensor 96 receives the light, a reset signal is supplied to the IC 94 and the IC 94 is reset. This photo sensor 96 is attached for example to the back side of the robot proper so that when the operator projects light during the driving, for example, the robot proper is brought into its resetting operation in a non-contact manner. The reset circuit of FIG. 13 shows the case in which an induction coil 98 is connected. When the induction coil 98 is subjected to electromagnetic induction, a reset signal is supplied to the IC 94 and the IC 94 is reset. The reset circuit of FIG. 14 shows the case in which a thermistor 100 is connected. When the thermistor 100 receives any heat energy so that its resistance is reduced, in response to this resistance change a reset signal is supplied to the IC 94 and the IC 94 is reset. The reset circuit of FIG. 15 shows the case in which a solar battery 102 is connected. When the solar battery 102 receives the light so that an electromotive force is produced, in response to the electromotive force a reset signal is supplied to the IC 94 and the IC 94 is reset. The reset circuit of FIG. 16 shows the case in which a Hall element is connected. When the Hall element 104 is subjected to a magnetic force so that an electromotive force is generated, in response to the electromotive force a reset signal is supplied to the IC 94 and the IC 94 is reset.

Figure 17:
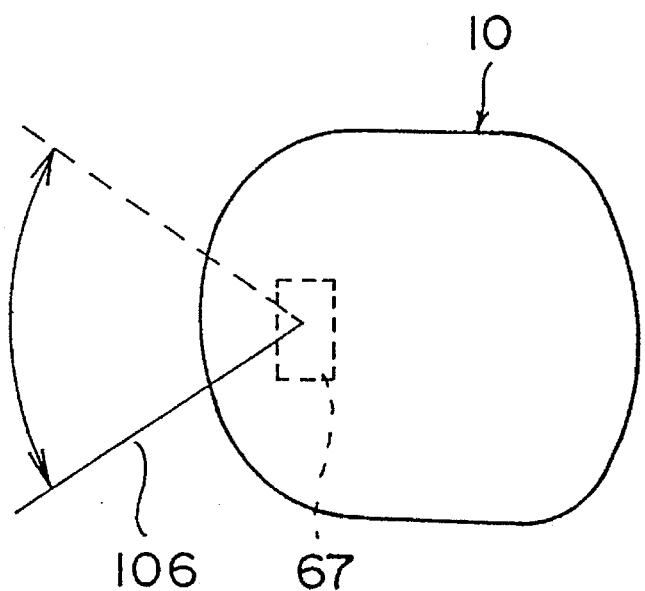
FIG. 17 is a top view of the robot proper of a micro robot according to another embodiment of the present invention.
Figure 18:
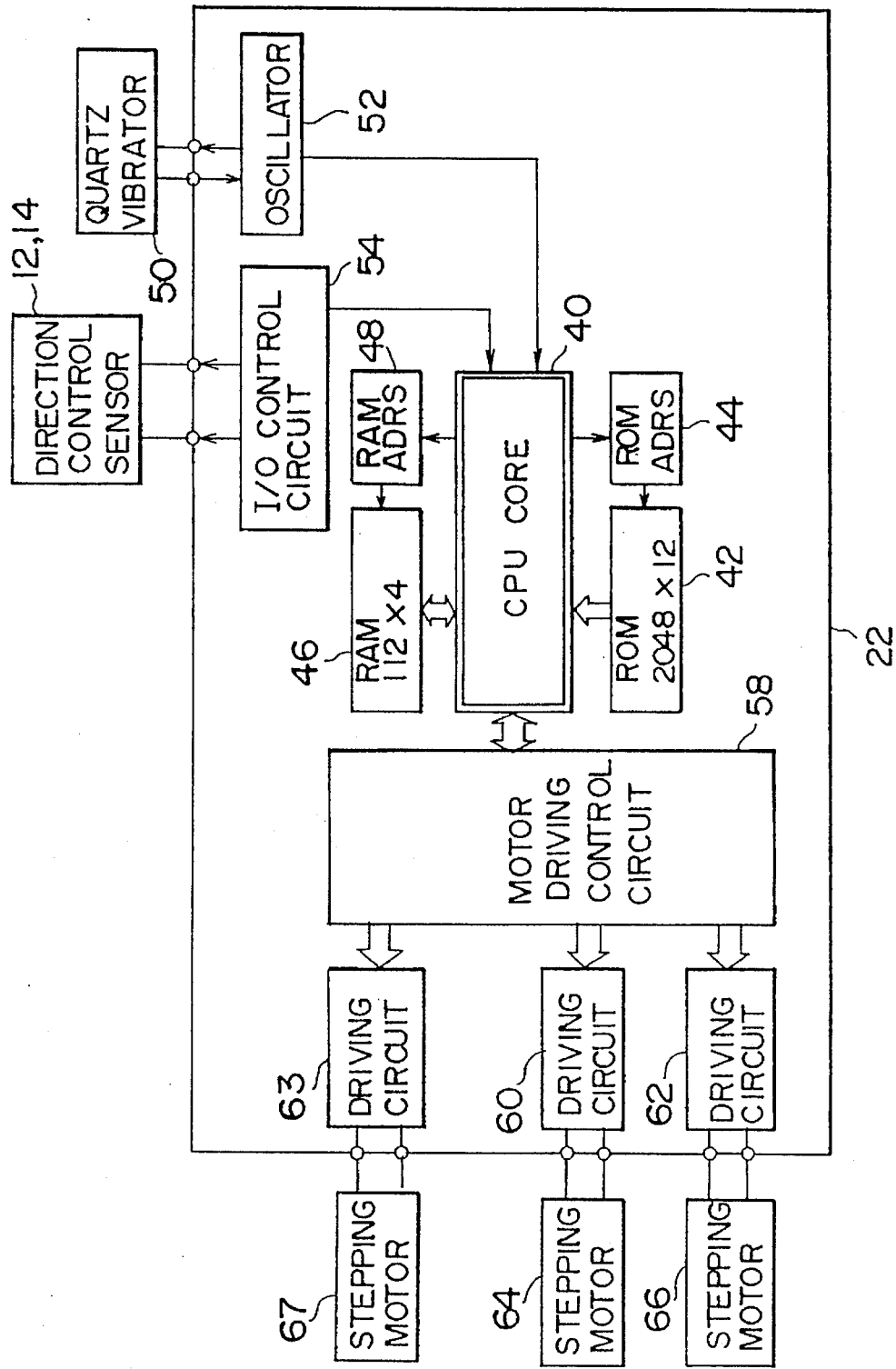
FIG. 18 is a block diagram showing the details of the circuit section in the micro robot of FIG. 17.

While the foregoing descriptions have been made on the cases in which the resetting operation is performed on the micro robot in a non-contact manner, it is desired that the robot proper automatically evades any obstacle which exists in a path in which the robot proper travels. FIG. 17 is a top view of the robot proper 10 giving consideration in this respect. Attached to the head of the robot proper 10 is a feeler 106 which is swung from side to side in the Figure. FIG. 18 is a block diagram showing the details of its circuit section. This embodiment includes a stepping motor 67 for driving the slender rod-shaped feeler 106 and a driving circuit 63 for controlling the stepping motor 67, and the driving circuit 63 is controlled by the motor driving control circuit 58.

Figure 19:
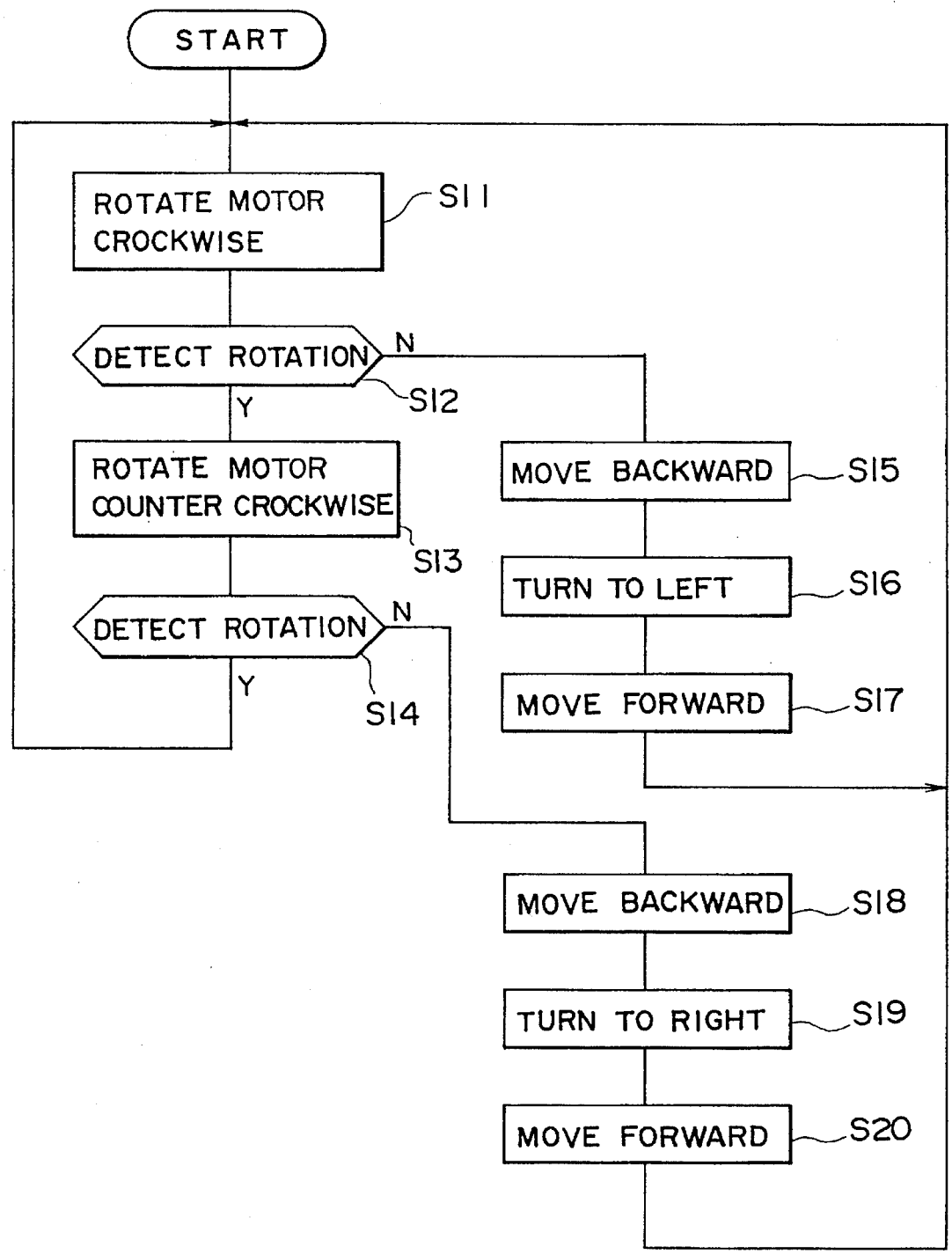
FIG. 19 is a flow chart showing the operation of the micro robot in FIGS. 17 and 18.

FIG. 19 is a flow chart showing the operation of the micro robot of FIG. 17 and 18. Firstly, it is assumed that the R-motor 64 and the L-motor 66 are in operation and the robot proper 10 is moving forward. In this condition, the stepping motor 67 is rotated clockwise to swing the feeler 106 to the right (S11). Then, it is detected whether the stepping motor 67 has been rotated (S12). At this time, the detection with respect to the presence or absence of the rotation utilizes the fact that the induced voltage in the energization coil is high when the stepping motor 67 is rotated and that the induced voltage is low when the motor is not rotated. For instance, when the stepping motor 67 is in rotation, as the rotor is rotated after the application of the driving pulses, in response to the rotation of the rotor an induced voltage is produced in the energization coil and an induced current flows. By detecting the magnitude of this induced current by a comparator, for example, it is possible to grasp the rotating condition. If the stepping motor 67 is not in the rotating condition, the rotor is not rotated after the application of the driving pulses so that no induced voltage is produced in the energization coil and no induced current flows. From this fact it is possible to grasp that the motor is not in the rotating condition.

As a result, the induced voltage of the motor 67 is introduced into the CPU core 40 through the driving circuit 63 and the motor driving control circuit 58 and the CPU core 40 detects the presence or absence of the rotation in accordance with the induced voltage. When it is determined that the stepping motor 67 is rotating normally, the motor 67 is rotated counterclockwise and the feeler 106 is swung to the left (S13). Then, in this case, it is similarly detected whether the motor 67 is rotating (S14). If it is determined that the motor 67 is rotating normally, a return is made to the initial condition and the motor 67 is rotated clockwise (S11). In this way, the robot proper 10 is moved forward while swinging the feeler 106 from side to side.

On the other hand, if, for example, the motor 67 is rotated clockwise and it is determined that its rotation is not normal (S12), the motors 64 and 66 are rotated in the reverse direction for a given time and the robot proper 10 is moved backward (S15). Thereafter, only the R-motor 64 is driven and the robot proper 10 is turned to the left (S16). Then, the stepping motors 64 and 66 are rotated in the forward direction and the robot proper is moved forward (S17) and a return is made to the initial operation. Also, if, for example, the motor 67 is rotated counterclock-wise and it is then determined that its rotation is not normal (S14), the motors 64 and 66 are rotated in the reverse direction for a given time and the robot proper 10 is moved backward (S18). Thereafter, only the L-motor 66 is driven and the robot proper 10 is turned to the right (S19). Then, the motors 64 and 66 are driven in the forward direction to move the robot proper forward (S20), and a return is made to the initial operation (S11).

Figure 20:
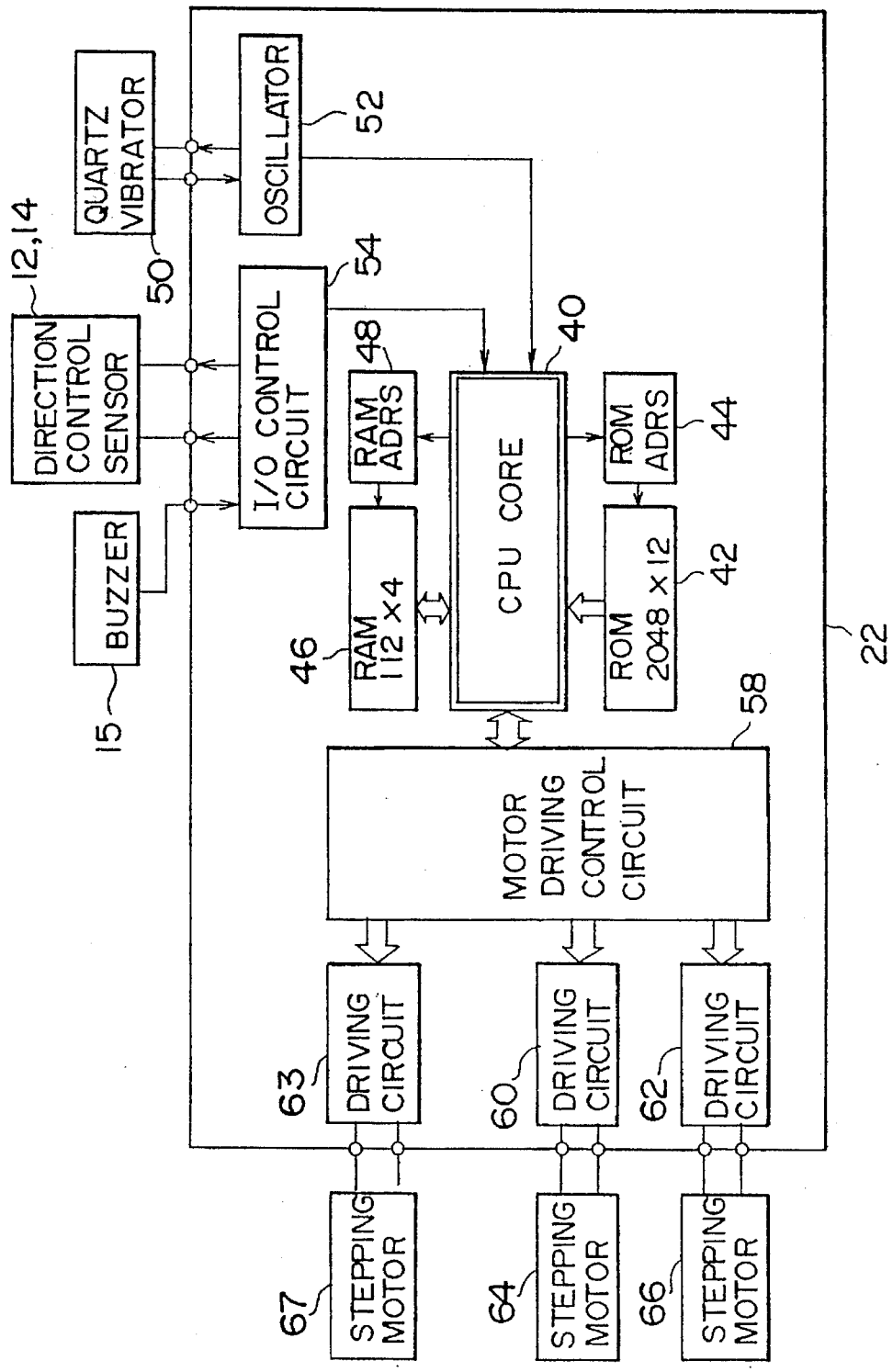
FIG. 20 is a block diagram showing the construction of the circuit section in a micro robot according to another embodiment of the present invention.

FIG. 20 is a block diagram showing the construction of a circuit section of a micro robot according to another embodiment of the present invention. In this embodiment, a buzzer 15 is connected to the I/O control circuit 54.

Figure 21:
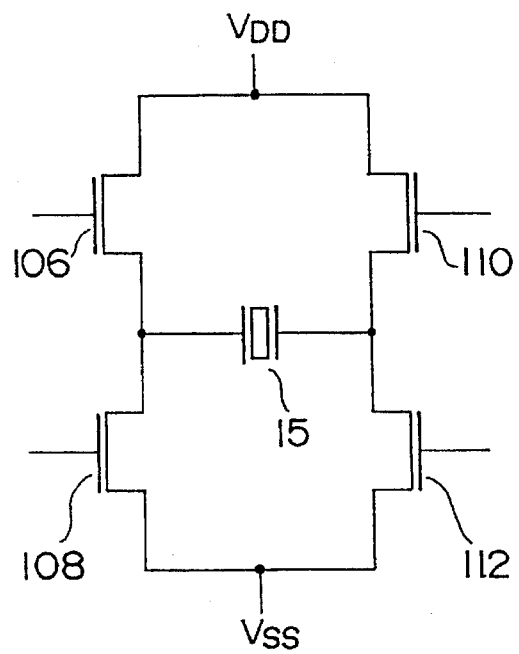
FIG. 21 is a circuit diagram showing the relation between the buzzer and the I/O control section in Fig. 20.

FIG. 21 is a circuit diagram showing the relation between the buzzer 15 and the I/O control circuit 54. FETs 106, 108, 110 and 112 for driving the buzzer 15 are H-connected. It is assumed that the FETs 106, 108, 110 and 112 are incorporated in the I/O control circuit 54. When the FETs 106 and 112 or 108 and 110 are driven, the buzzer 15 is driven to produce a buzzing sound.

Figure 22:
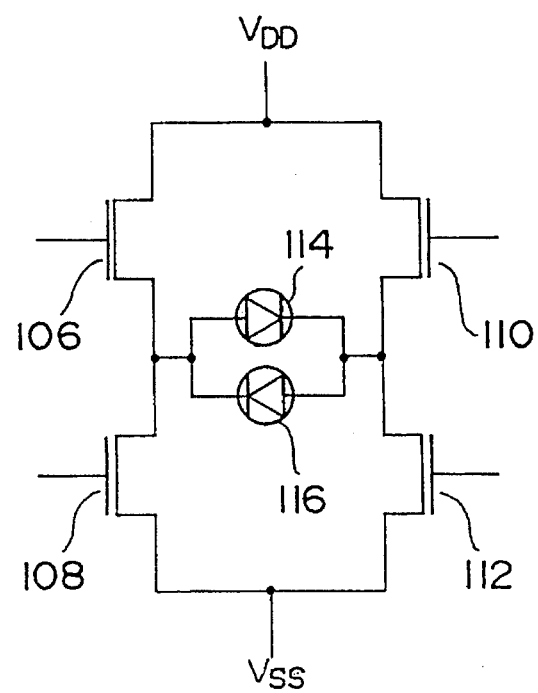
FIG. 22 shows a control circuit for the light-emitting diodes in a micro robot according to another embodiment of the present invention.

FIG. 22 is a circuit diagram showing an exemplary case in which light-emitting diodes 114 and 116 are connected back to back in place of the buzzer 15. By connecting the light-emitting diodes 114 and 116 as shown in the Figure, the two light-emitting diodes 114 and 116 can be separately turned on by use of two wires.

Figure 23:
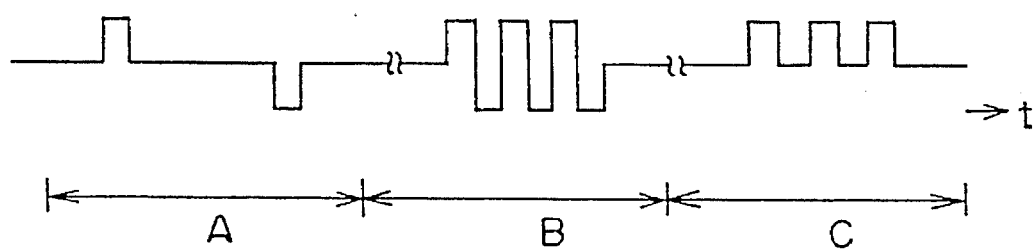
FIG. 23 is a timing chart showing the waveform of the current flowing to the light-emitting diodes of FIG. 22.

FIG. 23 is a timing chart showing the current waveform that flows in the FETs 106, 108, 110 and 112. It appears that in the indicated region A the light-emitting diodes 114 and 116 are alternately turned on and that in the region B the light-emitting diodes 114 and 116 are turned on simultaneously. Also, it appears that in the region C only the light-emitting diode 114 is for example turned on. Thus, the light-emitting diodes 114 and 116 can be suitably controlled in accordance with the controlled condition of the micro robot and its information can be transmitted to the outside.

The 24 is a flow chart showing an exemplary control of the light-emitting diodes. Here, description will be made of the case in which a voltage drop in the power supply unit 16 is detected. The CPU core 40 reads the voltage VH of the power supply unit 16 at a given period (S21), compares it with a reference voltage Vr (S22) and continues the required activity (e.g., travelling) when the voltage VH of the power supply unit 16 is higher than the reference voltage VR(23). On the contrary, if the voltage VH of the power supply unit 16 is lower than the reference voltage Vr, any of the currents in the timing chart of FIG. 23 is supplied to the light-emitting diodes 114 and 116 to effect the emission of light (S24). It is to be noted that this operation can be equally applied to the buzzer 15 of FIG. 21 so that when the voltage of the power supply unit 16 drops, the buzzer 15 is driven to produce a buzzing sound to inform to the outside to that effect. By virtue of such light emission or buzzing sound, the operator can grasp the drop in the voltage of the power supply unit 16 and he is allowed to know that now it is the time to charge the micro robot.

Figure 24:
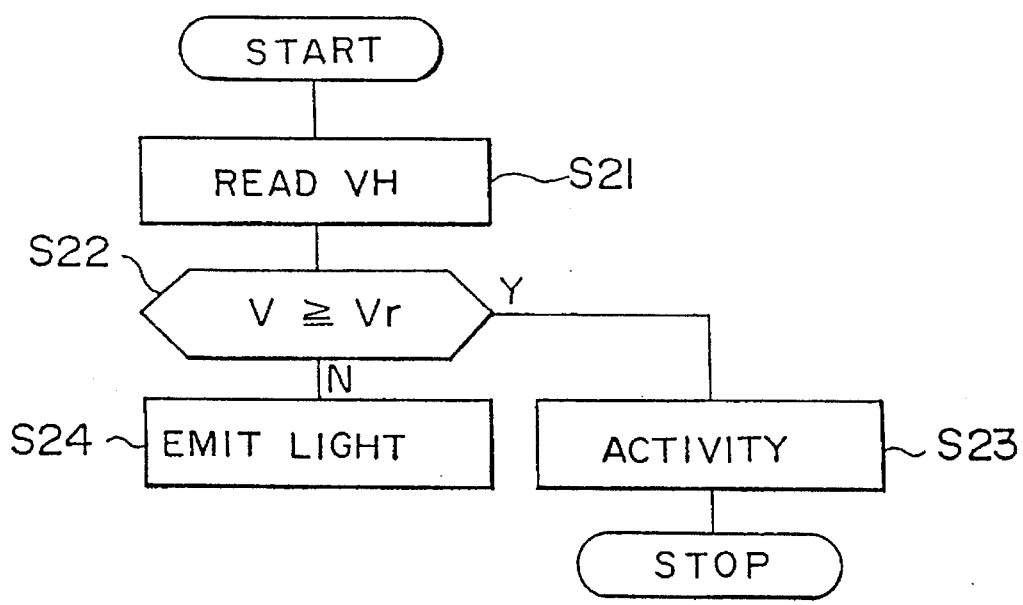
FIG. 24 is a flow chart showing an exemplary control of the light-emitting diodes of FIG. 22.
Figure 25:
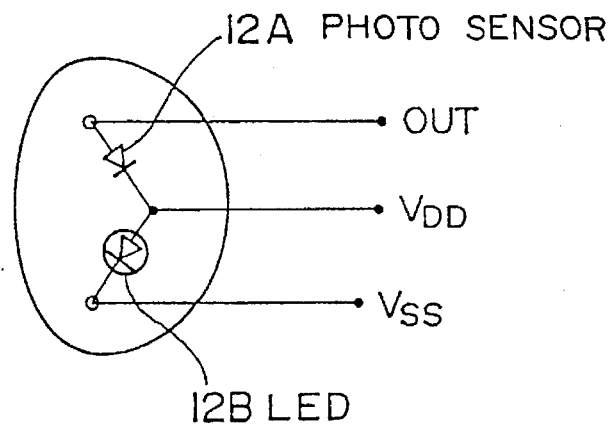
FIG. 25 is a diagram showing the circuit for the portion of the eye in the micro robot of FIG. 1.

FIG. 25 is a diagram showing the circuit for the eye portion of the micro robot of FIG. 1. In the Figure, a photo sensor 12A is connected between a terminal VDD and a terminal OUT, and a light-emitting diode 12B is connected between the terminal VDD and a terminal VSS; the photo sensor 12A and the light-emitting diode 12B are contained in one package and usued as such. Then, by controlling the potentials at the terminals OUT and $V_{SS}$, it is possible to alternately effect the sensing and the light emission. Therefore, the control of FIG. 24 can also be applied to the light-emitting diode 12B and the portion of the eye can concurrently serve the functions of light reception and light emission.

While, in this embodiment, the stepping motors 64, 66 and 67 are used for the motors, the following advantages can be attributed to the use of the stepping motors 64, 66 and a) The amount of movement can be controlled by software, i.e., the number of pulses.
b) The amount of movement can be controlled by software, i.e., the pulse width so that there is no need to vary the voltage of the power supply unit 16 and the control can be effected even with a constant voltage.
c) The speed can be controlled by use of software, e.g., the frequency and therefore the control is not affected by the voltage of the power supply to unit 16.

Figure 26:
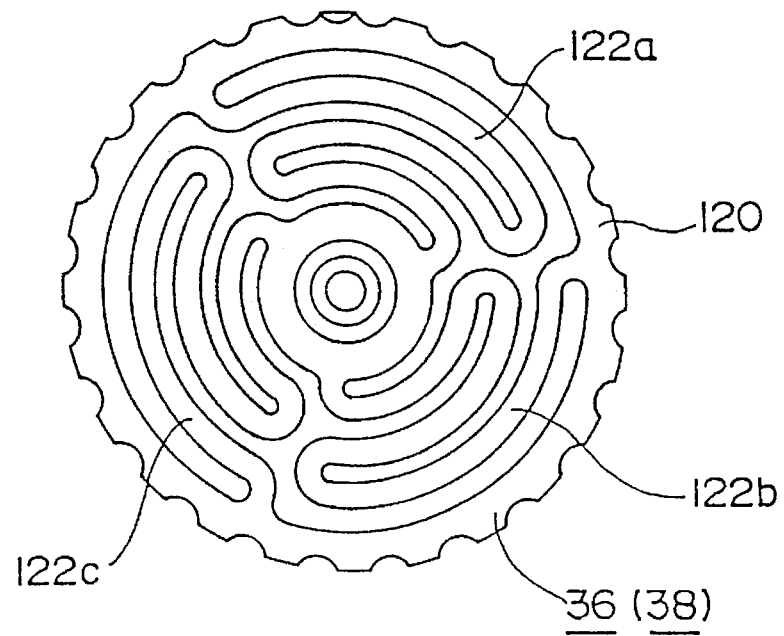
FIG. 26 is a side view showing another exemplary construction of the wheel of the micro robot in FIG. 1.

FIG. 26 is a side view showing another example of the construction of the wheels 36 and 38 in FIG. 3. This wheel is such that an outer ring 120 is supported by zigzag-shaped metal forked members 122a, 122b and 122c. By so constructing, there is the advantage that even if a strong force is applied, the wheel is deformed elastically and not permanently.

Next, a holding case for the above-described micro robot will be explained.

Figure 27:
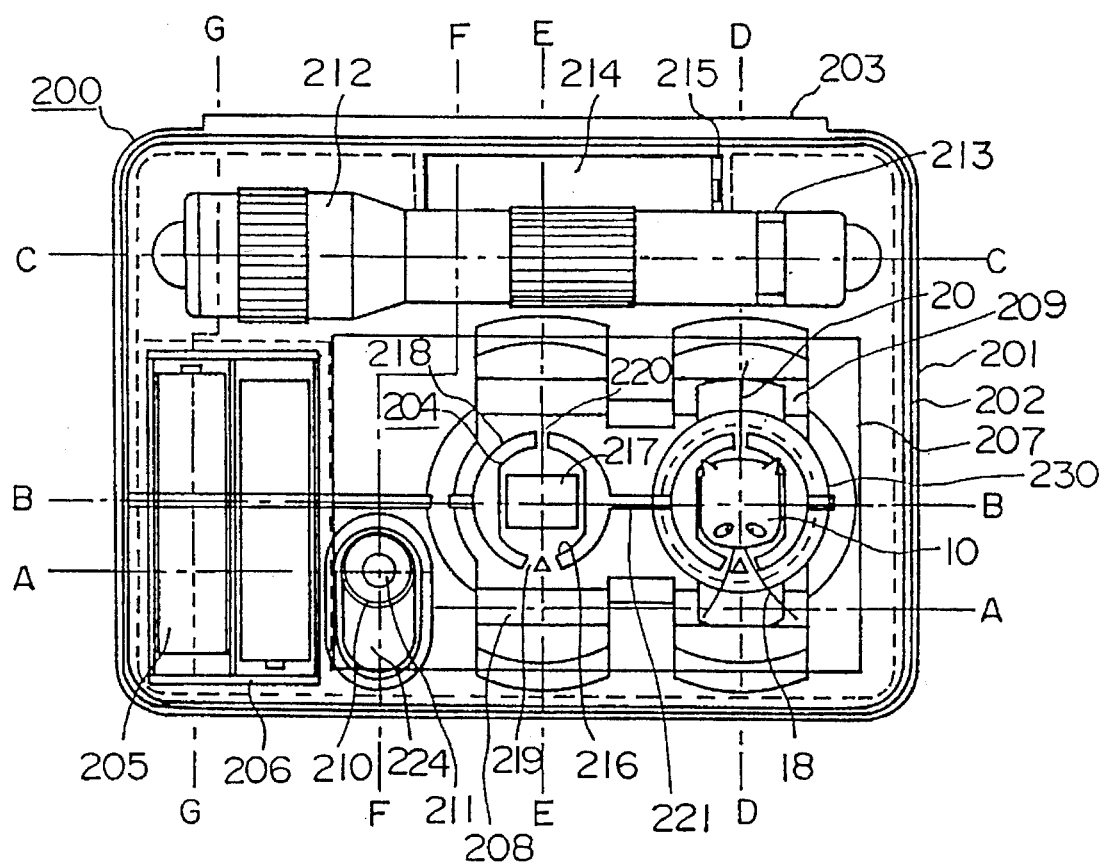
FIG. 27 is a holding case according to an embodiment of the present invention.
Figure 28:
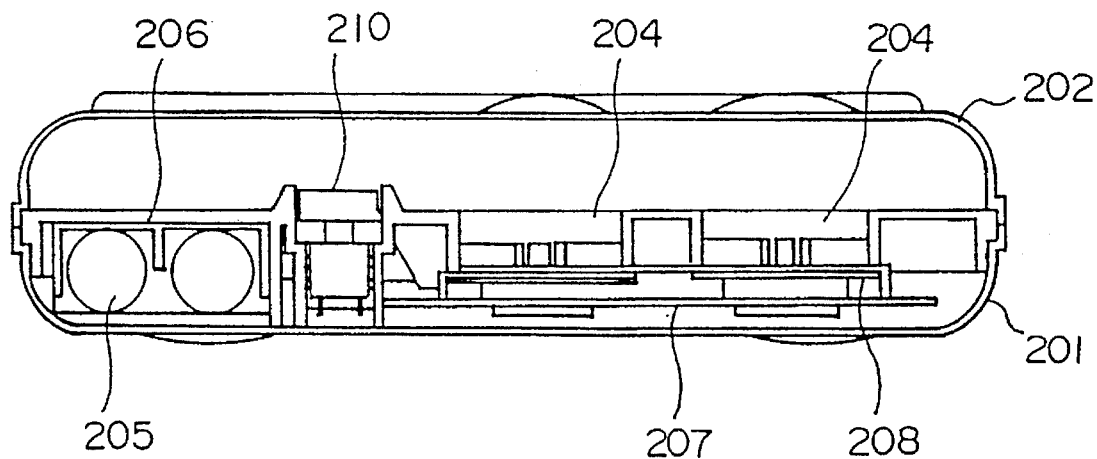
FIG. 28 is a sectional view taken along the line A—A of FIG. 27.
Figure 29:
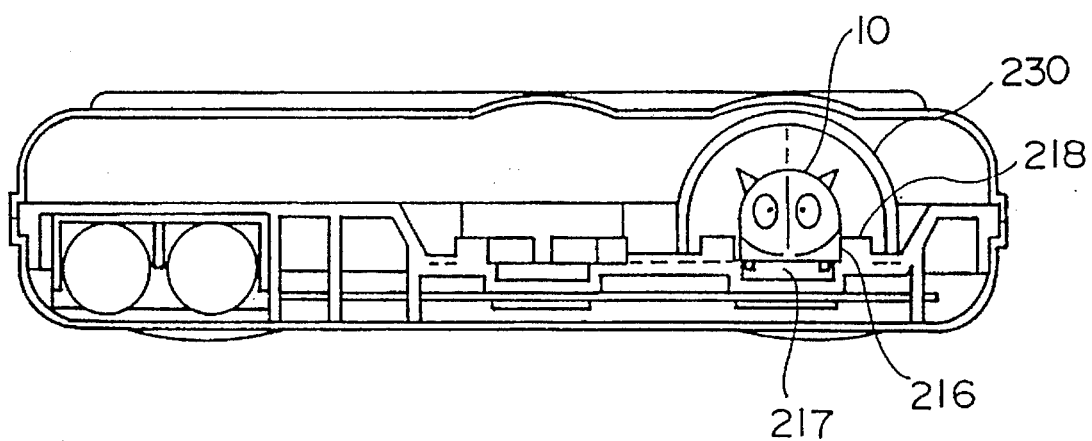
FIG. 29 is a sectional view taken along the line B—B of FIG. 27.
Figure 30:
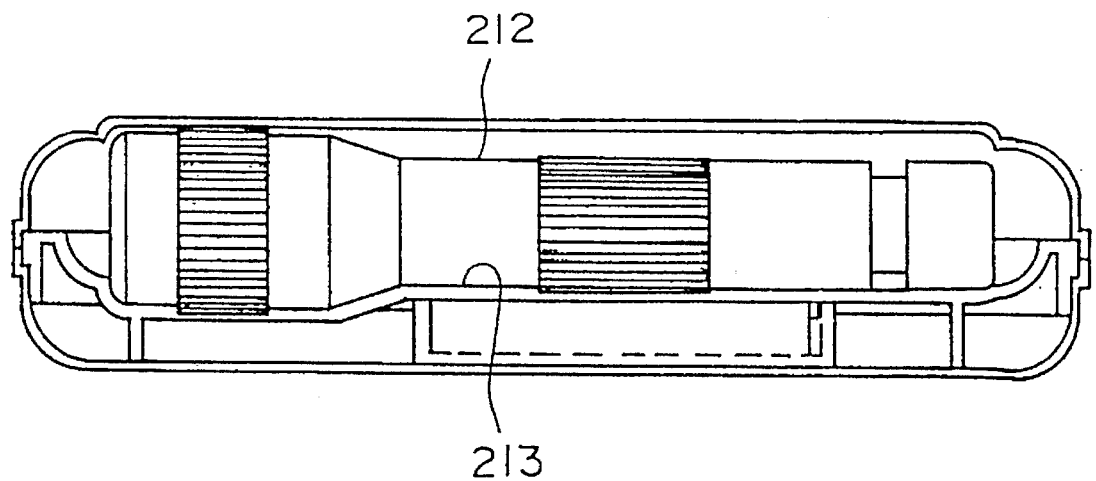
FIG. 30 is a sectional view taken along the line C—C of FIG. 27.
Figure 31:
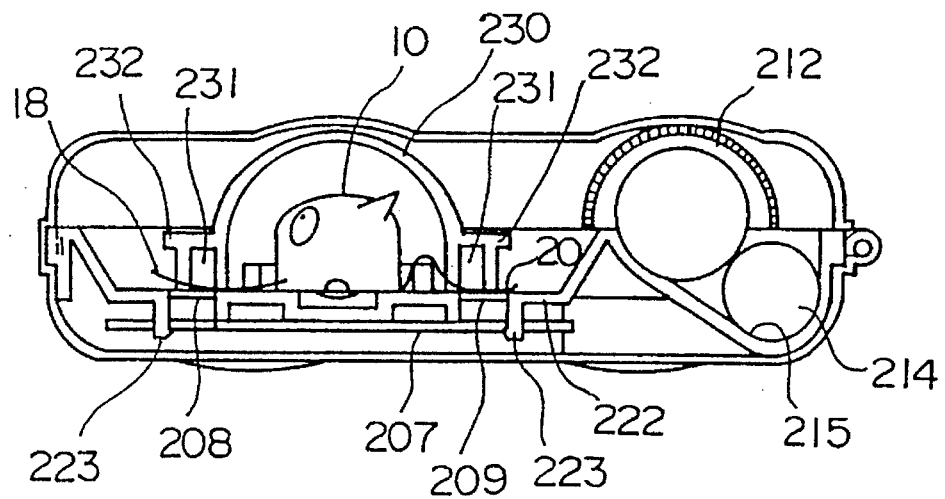
FIG. 31 is a sectional view taken along the line D—D of FIG. 27.
Figure 32:
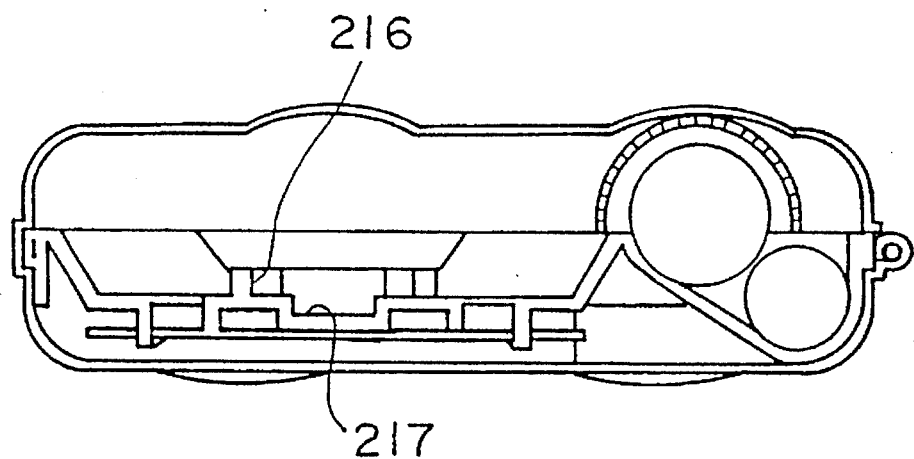
FIG. 32 is a sectional view taken along the line E—E of FIG. 27.
Figure 33:
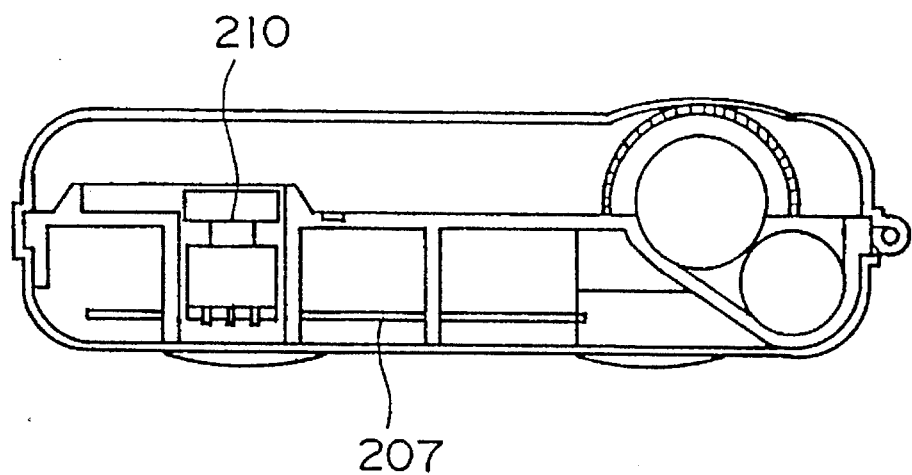
FIG. 33 is a sectional view taken along the line F—F of FIG. 27.
Figure 34:
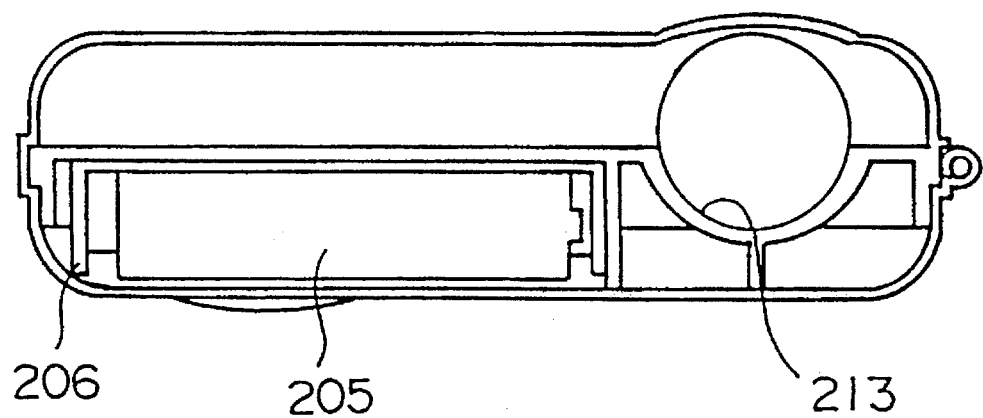
FIG. 34 is a sectional view taken along the line G—G of FIG. 27.

Referring to FIG. 27, there is illustrated a plan view of a holding case according to one embodiment of the present invention. Also, FIGS. 28 to 34 are respectively sectional views taken along the lines A—A to G—G of FIG. 27. This holding case comprises a case proper 201 and a cover 202 fastened to the case proper 201 by a hinge 203 so as to be opened and closed as desired. Also, while any given material can be used, an electrically conductive material is used for the purpose of protecting the micro robot 10 from static electricity.

The case proper 201 is formed with two holding cavities 204 for the robot 10. Also, there is provided a battery box 206 for receiving batteries 205 and the battery box 206 is connected to a base plate 207 formed with a charging circuit. The base plate 207 is arranged below the robot cavities 204 for the miniaturization of the holding case 200. In order to charge the battery power supply of the robot 10, electrodes 208 and 209 are parallely disposed on the base plate 207 in such a manner that the electrode 208 is connected to the lead terminals 18 corresponding to the feeler and the other electrode 209 is connected to the lead terminal 20 corresponding to the tail by means of a capsule which will be described later. Also disposed on the base plate 207 is a switch 210 having a battery checking lamp 211.

In addition, the case proper 201 is formed with a holding cavity 213 for a robot operating instrument 212, e.g., a light and a holding cavity 215 for a battery 214.

The layout of the respective elements is such that the robot cavities 204 are arranged on the right side, the battery box 206 on the left side, the base plate 207 below the robot cavities 204, the switch 210 on the right side but this side and the robot operating device on the front side with respect to the case proper 201, thereby simplifying their removal and handling and making the case more compact. It is to be noted that the holding cavity of the battery 214 is arranged obliquely below the robot operating device 212 in a parallel relation.

The constructions of the respective portions will now be described in detail.

(1) Robot cavities

The two robot cavities 204 are arranged side by side on the right side in the case proper 201 and each of them includes a recess 216 that fits to the external shape of the bottom of the robot 10 and a rectangular recess 217 in the central portion of the former for receiving the wheels 36 and 38. It is constructed so that the robot 10 is supported by the bottom surface of the recess 216 and the rectangular recess 217 provides an escape for the wheels 36 and 38 (the condition in which the robot 10 is not raised).

The recess 216 is surrounded by a circular rib 218 and the circular rib 218 is formed with slots 219 and 220 for respectively receiving the lead terminals 18 and 20. Note that numeral 221 designates a locating key for the capsule.

(2) Battery box

Since the power consumption of the robot 10 is extremely small, it is possible to ensure the service over a sufficiently long period of time by use of two battery of SUM-4 type. For this reason, the battery box 206 for receiving two batteries of SUM-4 type is arranged on the left side in the case proper 201. The batteries 205 are inserted from the back side of the case proper 201 and a back cover is fastened by a well known means.

(3) Base plate

The base plate 207 is held in place by pawls 223 projected below supports 222 of the robot cavities 204. Also, a recess 224 is formed on this side of the battery checking switch 210 to make the switch operation easy.

Figure 35:
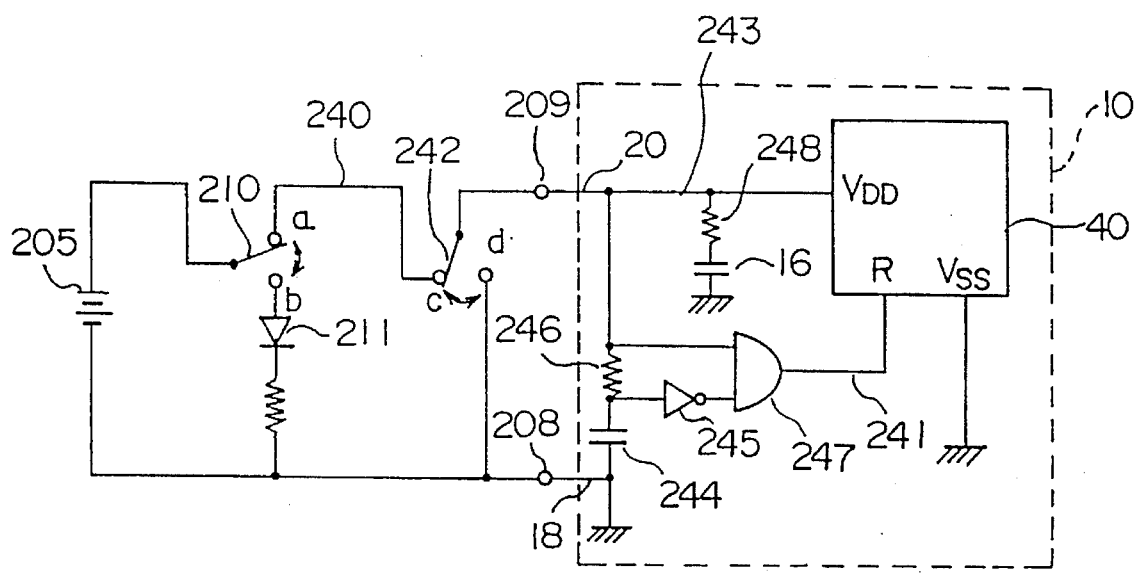
FIG.35 is a circuit diagram of the charging circuit.
Figure 36:
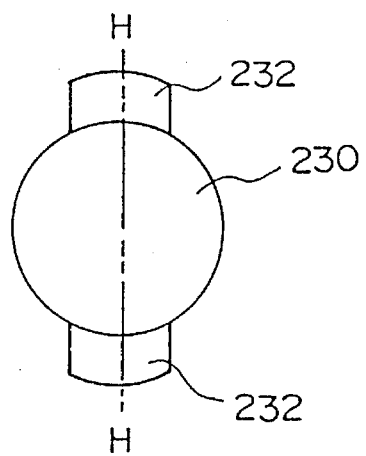
FIG. 36 is a plan view of the capsule.
Figure 37:
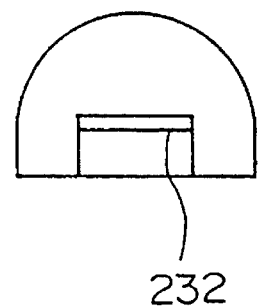
FIG. 37 is a front view of the capsule.
Figure 38:
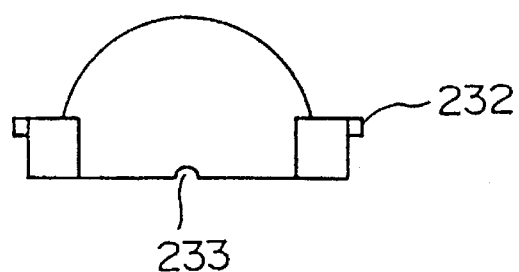
FIG. 38 is a side view of the capsule.
Figure 39:
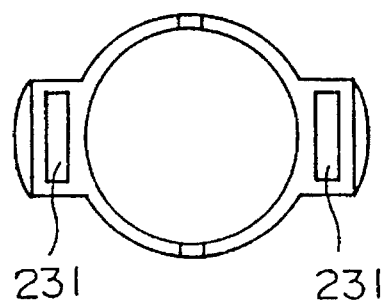
FIG. 39 is a bottom view of the capsule.
Figure 40:
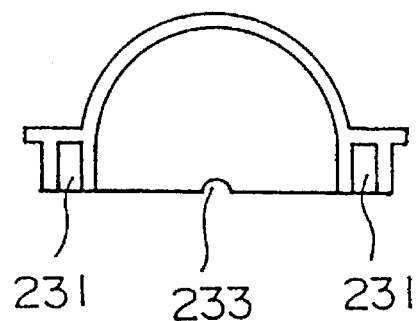
FIG. 40 is a sectional view taken along the line H—H of FIG. 36.

FIG. 35 shows an example of the charging circuit 240 formed on the base plate 207 and a power-on reset circuit 241 connected to the former. While the reset circuit 241 is incorporated on the robot proper side, it may be disposed on the base plate side by providing connecting terminals.

In FIG. 35, numeral 242 designates a reset switch operatively associated with the battery checking switch 210 whereby at the instant that the switch 210 is changed over to the lamp 211 side, the switch 242 disconnects the charging circuit 240 and thus a power supply circuit 243 of the robot 10 is shortlcircuited. Numeral 244 designates a capacitor, 245 an invertor, 246 a resistor, 247 an AND circuit, and 248 an internal resistor. Here, a light-emitting diode (LED) is used for the lamp 211. When the robot 10 is accommodated in the robot cavity 204, the switch 210 and the reset switch 242 are respectively on the side of contacts a and c shown in FIG. 35 and the charging of the battery power supply 16 of the robot 10 is started through the power supply circuit 243. At the same time that the charging is started, the connection upper end of the resistor 246 goes to a positive potential and its connection lower end at zero potential goes to a positive potential through the invertor 245, so that the logical product of the AND circuit 247 becomes "1" and the CPU core 40 of the robot 10 is reset. In other words, it is arranged so that the CPU core 40 is always reset by the power-on reset circuit 241 when the charging of the robot 10 is started and therefore the runaway of the CPU core 40 can be prevented. Then, when the capacitor 244 is charged, both of the connection ends of the resistor 246 go to the same positive potential so that one of the connection ends of the AND circuit 247 goes to the negative potential and the logical product of the AND circuit 247 becomes "0", thereby releasing the resetting of the CPU core 40.

On the other hand, if, for example, the operation of the robot 70 is not proper and thus it is required to confirm whether the improper operation is due to a drop in the power supply voltage or the program of the robot, it is only necessary to accommodate the robot 10 in the robot cavity 204 so that if the capacitor 244 has no charge, the charging is started as mentioned previously and also the CPU core 40 is reset, thus making it possible to determine from the behavior of the subsequent operation of the robot 10 which of these constitutes the cause.

Next, when making the battery check of the batteries 205, the switch 210 is changed over to the contact b side and it is now possible to confirm the remaining capacities of the batteries 205 in accordance with the lighting condition of the lamp 211. Also, at the same time that the switch 210 is changed over to the contact b side, the reset switch 242 is changed over to the contact d side. At this time, while the power supply circuit 243 is short-circuited, the discharged output of the battery power supply 16 is consumed by the internal resistor 248. Each time the switch 210 is returned to the initial position, the resetting is effected by the reset circuit 241.

(4) Capsules

The construction of the capsule 230 is shown in FIGS. 36 to 40. this capsule 230 is formed into a dome shape and it is adapted to be put on the accommodated robot 10. Also, it is formed on its sides with grip portions 232 each having a magnet 231 mounted therein. Therefore, The electrodes 208 and 209 disposed on the base plate 207 are made of a magnetic material. Also, the lead terminals 18 and 20 of the robot 10 are made of a wire rod having springiness so as to maintain given shapes. The bottom surface of the capsule 230 is formed with key ways 233 which engage with the key 221 for locating purposes. While the shape of the capsule 230 is not limited to the present embodiment, it may be advantageously made of a transparent plastic material.

The robot 10 is accommodated in the cavity 204 to face the proper direction and the lead terminals 18 and 20 are respectively placed on the electrodes 208 and 209 thereafter, the capsule 230 is put on the robot 10. Since the capsule 230 is attracted and fixedly placed on the electrodes 208 and 209 of magnetic material by the magnets 231 with the lead terminals 18 and 20 being held therebetween, the lead terminals 18 and 20 can be easily connected to the electrode 208 and 209, respectively. It is possible to design so that the magnets are arranged on the side of the electrode 208 and 209 and the magnetic material is mounted on the capsule 230 side.

Figure 41:
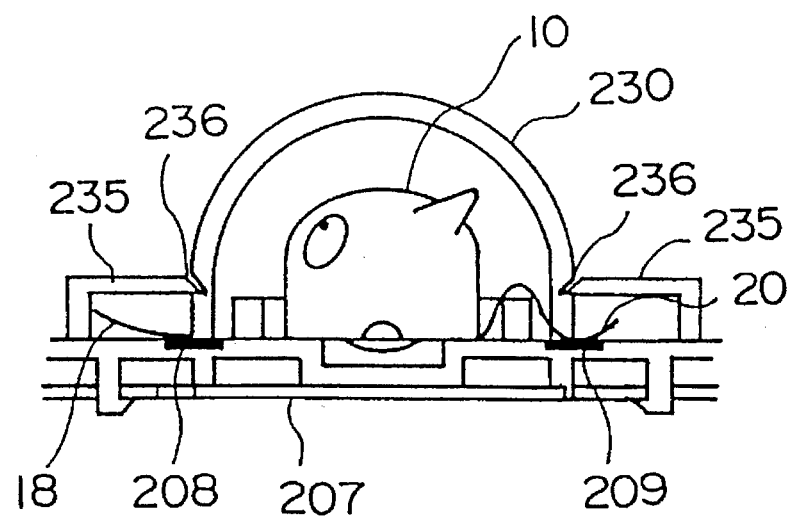
FIG. 41 is a sectional view showing another fixing method of the capsule.

FIG. 41 shows another fixing means for the capsule 230. This is a detachable fixing means utilizing mechanical engagement so that a plurality of springy pawls 235 are provided on the periphery of the robot cavity 204 and a plurality of slots 235 are formed in the outer periphery of the capsule 230 for engagement with the pawls 235.

When the capsule 230 is put on the accommodated robot 10, the pawls 235 are respectively engaged with the slots 236 and thus the capsule 230 is fastened to the robot cavity 204. Of course, at this time the lead terminals 18 and 20 are held between the lower end face of the capsule 230 and the electrodes 208 and 209 and connected to the latter. The capsule 230 is pulled out by holding its grips which are not shown by the hand.

(5) Robot Operating Instrument and Cavity for Holding its Battery:

The robot operating instrument 212 is parallel accommodated in the lengthwise direction on the front side (the hinge side) in the case proper 201. The battery 214 is received in the battery cavity 215 disposed obliquely below the operating instrument cavity 213. Since the use of a relatively weak light source is sufficient for the operation of the robot 10, the robot operating instrument 212 can be comprised of a considerably small-sized light. Also, if the light is of the type which permits the adjustment of the condensing and scattering of light, it is possible to control a single robot from a distance or alternatively a plurality of robots can be simultaneously controlled at hand.

Since the holding case of this embodiment is constructed as described hereinabove, during the time that the robot 10 is accommodated the electricity of the batteries 205 in the battery box 206 flows to the battery power supply 16 of the robot 10 through the charging circuit 240 of the base plate 207 and the electrodes 208 and 209 and through the lead terminals 18 and 20 respectively connected to the electrodes 208 and 209 and the power supply 16 is charged at all times. Therefore, there is no need to remove the robot 10 from the robot cavity 204 and separately effect the charging, etc., and the robot 10 can be operated without delay. Also, by simply putting the capsule 230 on the accommodated robot 10, it is possible to easily connect the lead terminals 18 and 20 to the electrodes 208 and 209, respectively. Further, since it is designed so that at the start of the charging the CPU core 40 of the robot 10 is reset by the reset circuit 241, there is the effect of preventing runaway of the CPU core 40.

Also, since the robot 10 and the articles required for its operation, i.e., the operating instrument 212 constituting a light source, the batteries 205 and 214, the base plate 207, the battery checking switch 210, etc., are rationally arranged and accommodated as mentioned previously, the robot, etc., are readily removable and easy to handle and the holding case can be made as small and compact as a pocketable one.

Then, in addition to the above-mentioned charging function, the holding case 200 can be provided with the following functions.

Figure 42:
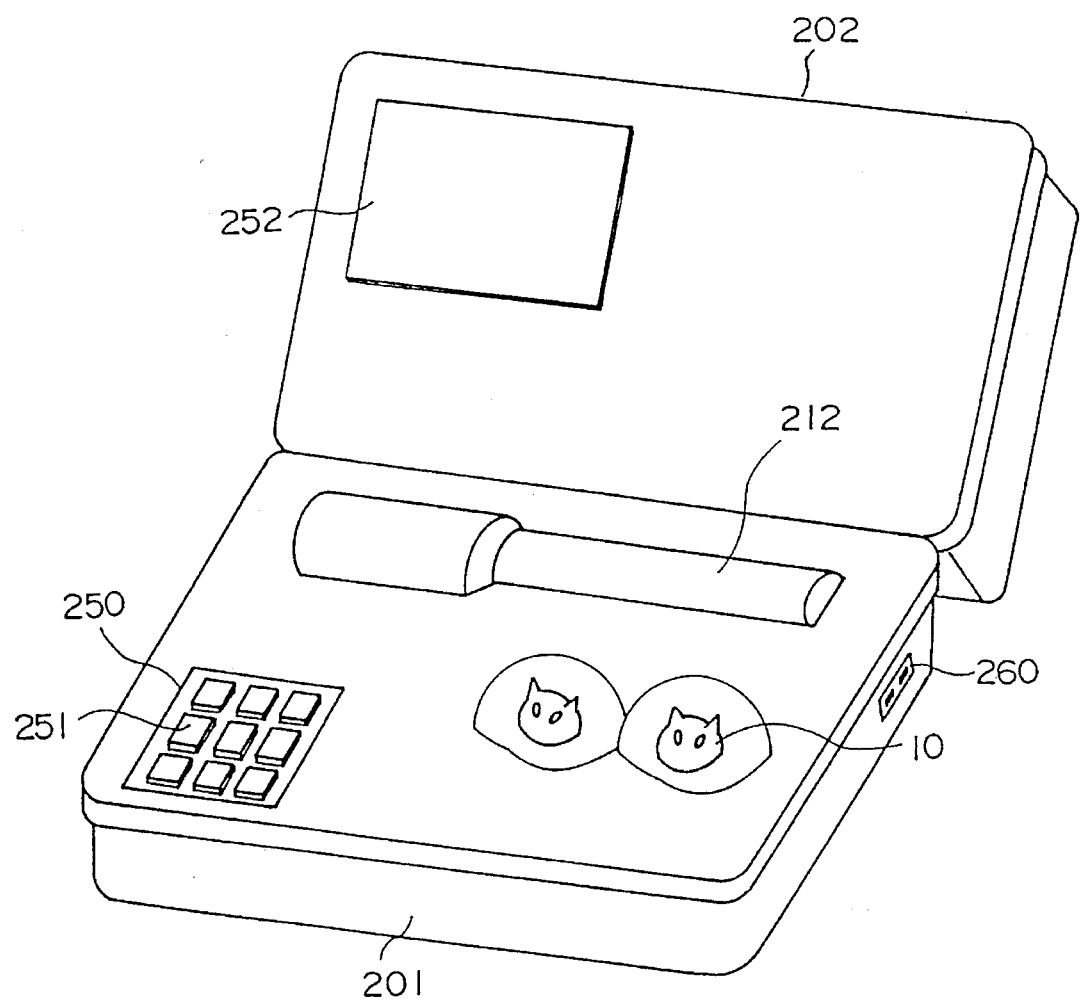
FIG. 42 is a perspective view of a holding case showing another embodiment of the present invention.

FIG. 42 shows the holding case 200 having command means 250 for the robot 10 by way of example.

In this embodiment, a keyboard 251 is disposed on the battery box of the case proapr 201 and a monitor panel 252 is arranged on the cover 202. In response to the command operations of the keyboard 251, such information as the program contents of the robot 10 and the internal power supply voltage can be displayed on the monitor panel 252. It is to be noted that the light 212 is not always required and it may be eliminated if the robot 10 is operated in accordance with the program. A connecting terminal 260 is one for effecting the transmission and reception of signals with an external personal computer, an external memory or the like and it is possible to effect a programming by the personal computer or to read in the program from the external memory.

Figure 43:
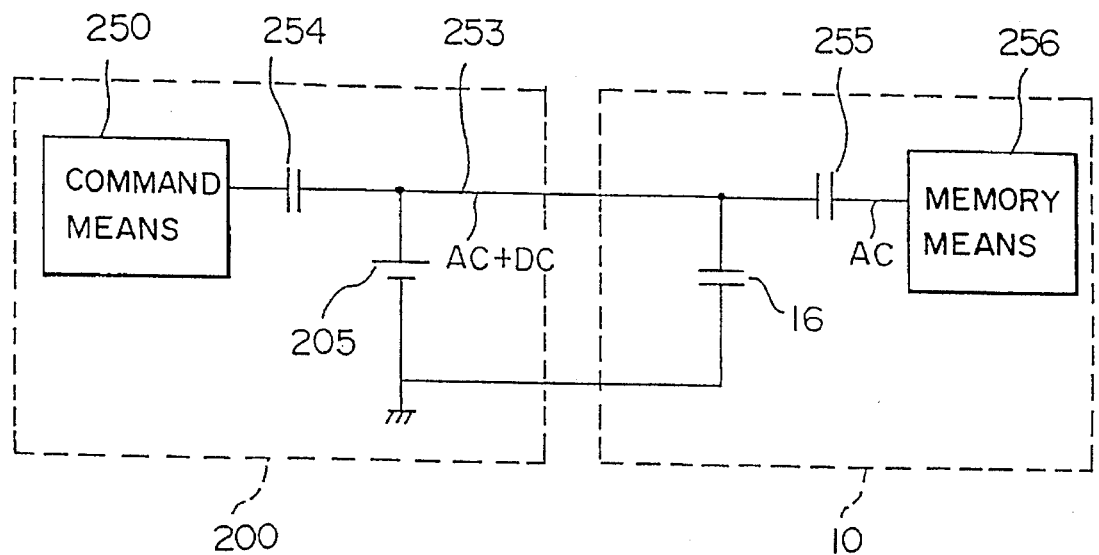
FIG. 43 is a circuit diagram showing the method of transmission and reception of information between the command means and the robot.
Figure 44:
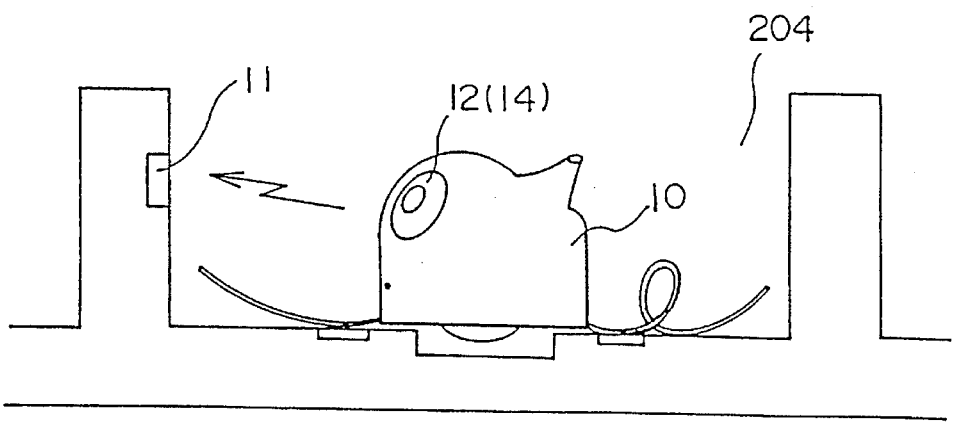
FIG. 44 is an explanatory diagram showing another exemplary method of transmission and reception of information between the command means and the robot.

Included among the information transmission and reception methods for the transmission of signals to a robot and the gathering of information from the robot are one which utilizes a special-purpose connector, another one which superposes signals on a power supply line by means of an AC signal as shown in FIG. 43, still another one which utilizes photo couplers, magnetic sensors or the like as shown in FIG. 44 and so on. Here, the latter two methods will be explained chiefly.

FIG. 43 is a block diagram showing the method of superposing on a power supply line by means of an AC signal. This operation circuit 253 is constructed by interconnecting the command means 250 and the charging circuit 240 on the holding case 200 side through a capacitor 254 serving as DC cutting means and interconnecting the charging circuit 240 and the memory means 256 in the CPU core on the robot proper through a capacitor 255 similarly serving as DC cutting means it is to be noted that the power-on reset circuit means 241 of FIG. 35 is omitted in the Figure.

Thus, in accordance with this construction the transmission and reception of information in both directions can be effected by superposing information signals on the AC signal in the power supply line.

Figure 45:
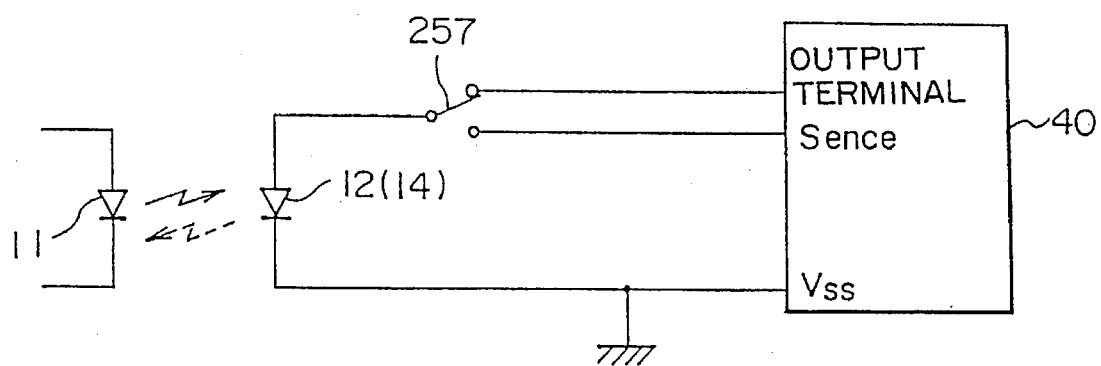
FIG. 45 is a circuit diagram for another example of FIG. 44.

FIG. 44 shows the method which utilizes photo couplers, magnetic sensors or the like, and FIG. 45 is its circuit diagram. The robot proper is provided with an optical device 12 (or 14; the one or the other thereof may be sufficient) concurrently serving as a photo sensor and an LED, and also an optical device 11 similarly concurrently serving as a photo sensor and an LED is dipsosed in the wall of the robot cavity 204 in opposition to the former device.

In accordance with this construction, when pulse signals are transmitted from the command means 250, the device 11 responds to the command signals to intermittently emit light and this intermittent light is received by the device 12 (or 14) incorporated in the eye of the robot 10, thereby inputting the information into the CPU core 40. On the other hand, when the stored information is to be delivered to the outside from the robot 10, a switch 257 can be changed over to the sensing side so as to similarly take out the internal information. Therefore, when the transmission and reception of information is taking place, the eye portions of the robot 10 intermittently produce light.

It is to be noted that in accordance with the present invention the electrical connection between the robot 10 and the base plate electrodes 208 and 209 is not limited to the previously mentioned method of holding the lead terminals 18 and 20 between the electrodes 208 and 209 and the robot 10 by means of the magnets 231 of the capsule 230 and it is possible to use a construction in which the robot 10 is brought into frictional contact with the electrodes by means of the wheels or other connecting terminals.

In short, it is only necessary that the connections to the electrodes are made at the instant that the robot 10 is accommodated. It does not matter whether the energy supply means for the robot is of the contact type or the non-contact type. Also, a spring for pressing the head of the robot 10 can be disposed within the capsule.

Further, while the robot 10 has been described in terms of one which is movable by sensing light, it is possible to cause the robot to make a similar operation by means of infrared light, ultrasonic wave or the like and naturally the corresponding operating instrument must be used.

Still further, digital indicators for indicating the battery residual capacities, etc., can be disposed at suitable locations on the base plate 207, and moreover the holding case cover 202 can be utilized so as to accommodate tools, switches, etc.

What is claimed is:

1. A micro robot comprising:
   at least two sensor means each having a detection area partly overlapping each other, and generating an output in accordance with a detected quantity, at least one pair of wheel driving means adapted to be driven independently of each other;
   a control means including a CPU for controlling said wheel driving means in accordance with the outputs of said sensor means;
   a power supply unit including a rechargeable battery for supplying a power supply voltage to said sensor means, said wheel driving means and said control means; and
   a reset circuit responsive to reception of an external command in a non-contact manner to send a reset signal to said control means.

2. A micro robot comprising:
   at least two sensor means each having a detection area partly overlapping each other and generating an output in accordance with a detected quantity;

at least one pair of wheel driving means adapted to be driven independently of each other;

a control means including a CPU for controlling said wheel driving means in accordance with the outputs of said sensor means;

a power supply unit including a rechargeable battery and a voltage regulator circuit for regulating and outputting a voltage of said battery for supplying power supply voltage to said sensor means, said wheel driving means, and said control means; and a starting control circuit whereby during starting an output voltage of said battery and a reset signal are supplied to said control means and then after a lapse of predetermined time an output voltage of said voltage regulator circuit is supplied in place of the output voltage of said battery to said control means while releasing said reset signal.

3. A micro robot comprising:

at least two sensor means each having a detection area partly overlapping each other and generating an output in accordance with a detected quantity.;

an obstruction sensor means made of a slender rod-shaped member having one end adapted to serve as a fulcrum and the other end adapted to make a turning movement thereby detecting an obstruction in accordance with an operating condition thereof;

at least one pair of wheel driving means adapted to be driven independently of each other;

a control means including a CPU for controlling said wheel driving means in accordance with the outputs of said two sensor means, and, in response to detection of an obstruction by said obstruction sensor means, driving at least one of said wheel driving means in reverse direction for a given period of time and thereafter returning to a steady-state operation; and a power supply unit including a rechargeable battery and a voltage regulator circuit for regulating and outputting a voltage of said battery for supplying a power supply voltage to said sensor means, said wheel driving means, and said control means; and a starting control circuit whereby during starting an output voltage of said battery and a reset signal are supplied to said control means and then after a lapse of predetermined time an output voltage of said voltage regulator circuit is supplied in place of the output voltage of said battery to said control means while releasing said reset signal.

4. A micro robot as set forth in claim 1, further comprising sounding means adapted to be controlled by said controller.

5. A micro robot as set forth in claim 1, further comprising a pair of light-emitting diodes, connected inverse parallel and controlled by said controller.

6. A micro robot as set forth in claim 1, wherein each of said two sensors is contained, along with a light-emitting diode, in one package and arranged at the position of an eye of said micro robot.

7. A micro robot as set forth in claim 1, wherein each of said drive units includes a wheel composed of an outer ring and a plurality of zigzag-shaped forked members for supporting said outer ring.

8. A holding case for a micro robot comprising:

at least one cavity for supporting a micro robot;

a battery box for receiving batteries capable of charging a power supply of said micro robot;

a base plate forming a charging circuit connected to said battery box for enabling charging of said micro robot, said base plate including energy supply electrodes adapted for contacting corresponding lead terminals of said micro robot;

a detachable capsule for covering said micro robot and an engaging means for engaging said micro robot to said cavity so that said lead terminals of said micro robot contact said energy supply electrodes; and a cavity for receiving an operating instrument for said micro robot.

9. A micro robot holding case as set forth in claim 8, wherein at least any of the relations of an arrangement is satisfied in which with respect to said case proper, said robot cavity is on the right side, said battery box is on the left side, said base plate is below said robot cavity, and said operating instrument cavity is on the front side.

10. A micro robot holding case as set forth in claim 9, wherein a plurality of said robot cavities are provided between a plurality of connecting electrodes for said micro robot which are disposed on said base plate.

11. A micro robot holding case as set forth in claim 10, wherein said engaging means includes a plurality of magnets adapted to be attracted to said electrodes on said base plate whereby said lead terminals of said micro robot are held and fixed in place between said capsule and said electrodes by the attractive force of said magnets.

12. A micro robot holding case as set forth in claim 8, wherein said case proper includes signal transmission means for transmitting to and receiving signals from a controller incorporated in said micro robot to govern the operation of said micro robot, and an operation circuit for performing at least command operations on the controller of said micro robot.

13. A micro robot holding case as set forth in claim, 12, wherein said operation circuit in includes a reset circuit for resetting said charging circuit and the controller of said micro robot.

14. A micro robot holding case as set forth in claim 13, wherein said reset circuit is incorporated in said micro robot.

15. A micro robot holding case as set forth in claim 8, wherein said charging circuit includes a battery checking switch, and a reset switch operatively associated with said checking switch to short-circuit a power supply circuit of said micro robot.

* * * * *